United States Patent
Kim et al.

(10) Patent No.: US 12,542,166 B2
(45) Date of Patent: Feb. 3, 2026

(54) MEMORY DEVICE AND METHOD FOR SYNCHRONIZING COMMAND START POINT (CSP)

(71) Applicant: SAMSUNG ELECTRONICS CO., LTD., Suwon-si (KR)

(72) Inventors: Hyeran Kim, Suwon-si (KR); Taeyoung Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 18/529,876

(22) Filed: Dec. 5, 2023

(65) Prior Publication Data

US 2024/0265957 A1 Aug. 8, 2024

(30) Foreign Application Priority Data

Feb. 2, 2023 (KR) .................. 10-2023-0014444
May 2, 2023 (KR) .................. 10-2023-0057365
Sep. 21, 2023 (KR) .................. 10-2023-0126401

(51) Int. Cl.
*G11C 8/18* (2006.01)

(52) U.S. Cl.
CPC .................... *G11C 8/18* (2013.01)

(58) Field of Classification Search
CPC .............................. G11C 8/18; G06F 11/1048
USPC ....................................................... 365/233.1
See application file for complete search history.

(56) References Cited

U.S. PATENT DOCUMENTS

| 6,742,159 | B2 | 5/2004 | Sakurai |
| 7,234,099 | B2 | 6/2007 | Gower et al. |
| 9,032,279 | B2 | 5/2015 | Song |
| 9,442,871 | B2 | 9/2016 | Bains et al. |
| 9,577,671 | B2 | 2/2017 | Kim |
| 10,186,309 | B2 | 1/2019 | Oh et al. |

(Continued)

FOREIGN PATENT DOCUMENTS

| KR | 10-0843871 B1 | 7/2008 |
| KR | 10-2016-0068369 A | 6/2016 |

(Continued)

OTHER PUBLICATIONS

European Extended Search Report issued Jun. 12, 2024 by the European Patent Office for EP Patent Application No. 24151541.0.

*Primary Examiner* — Huan Hoang
(74) *Attorney, Agent, or Firm* — Sughrue Mion, PLLC

(57) ABSTRACT

Provided are a memory device and a method for command start point (CSP) synchronization. The memory device includes: a control logic circuit configured to receive command address (CA) signals and control an operation of the memory device; a clock circuit configured receive a clock signal and divide the clock signal to generate first to fourth phase clock signals that are respectively synchronized with first to fourth rising edges of the CA signals indicating a command start point (CSP) command, wherein the first to fourth rising edges of the CA signals constitute a command window; and a CA parity circuit configured to perform a command address parity (CAPAR) checking operation on the CSP command, wherein the CAPAR checking operation includes a plurality of operations respectively corresponding to rolling windows in which the command window is delayed by one clock cycle of the clock signal.

20 Claims, 41 Drawing Sheets

(56) References Cited

U.S. PATENT DOCUMENTS 10,692,555 B2    6/2020  Oh et al.
2020/0111523 A1\*  4/2020  Lee ..................... G06F 11/1068

FOREIGN PATENT DOCUMENTS

| KR | 10-1685435 B1 | 12/2016 |
| KR | 10-1907068 B1 | 10/2018 |
| KR | 10-21 42589 B1 | 8/2020 |

\* cited by examiner

FIG. 5B

| CSP CMD | WCK n | WCK n+1 | WCK n+2 | WCK n+3 |
|---|---|---|---|---|
| CA0 | 1 | 1 | 1 | 1 |
| CA1 | 0 | 1 | 1 | 1 |
| CA2 | 1 | 1 | 1 | 1 |
| CA3 | 0 | 1 | 1 | 1 |
| CA4 | 1 | 1 | 1 | 1 |

| NOP CMD | WCK n | WCK n+1 | WCK n+2 | WCK n+3 |
|---|---|---|---|---|
| CA0 | 1 | 1 | 1 | 1 |
| CA1 | 1 | 1 | 1 | 1 |
| CA2 | 1 | 1 | 1 | 1 |
| CA3 | 1 | 1 | 1 | 1 |
| CA4 | 1 | 1 | 1 | 1 |

|  | WCK -4 | WCK -3 | WCK -2 | WCK -1 | WCK 0 | WCK 1 | WCK 2 | WCK 3 | WCK 4 | WCK 5 | WCK 6 | WCK 7 |
|---|---|---|---|---|---|---|---|---|---|---|---|---|
| CA0 | 1 | 1 | 1 | 1 | 1 | 1 | 1 | 1 | 1 | 1 | 1 | 1 |
| CA1 | 1 | 1 | 1 | 1 | 0 | 1 | 1 | 1 | 1 | 1 | 1 | 1 |
| CA2 | 1 | 1 | 1 | 1 | 1 | 1 | 1 | 1 | 1 | 1 | 1 | 1 |
| CA3 | 1 | 1 | 1 | 1 | 0 | 1 | 1 | 1 | 1 | 1 | 1 | 1 |
| CA4 | 1 | 1 | 1 | 1 | 1 | 1 | 1 | 1 | 1 | 1 | 1 | 1 |

SP

700

☐ CSP command

FIG. 7B

|  | WCK -4 | WCK -3 | WCK -2 | WCK -1 | WCK 0 | WCK 1 | WCK 2 | WCK 3 | WCK 4 | WCK 5 | WCK 6 | WCK 7 |
|---|---|---|---|---|---|---|---|---|---|---|---|---|
| CA0 | 1 | 1 | 1 | 1 | 1 | 1 | 1 | 1 | 1 | 1 | 1 | 1 |
| CA1 | 1 | 1 | 1 | 1 | 1 | 0 | 1 | 1 | 1 | 1 | 1 | 1 |
| CA2 | 1 | 1 | 1 | 1 | 1 | 1 | 1 | 1 | 1 | 1 | 1 | 1 |
| CA3 | 1 | 1 | 1 | 1 | 1 | 0 | 1 | 1 | 1 | 1 | 1 | 1 |
| CA4 | 1 | 1 | 1 | 1 | 1 | 1 | 1 | 1 | 1 | 1 | 1 | 1 |

SP ↓ (at WCK 1), ↓ (at WCK 5)

701

☐ CSP command

FIG. 7C

|  | WCK -4 | WCK -3 | WCK -2 | WCK -1 | WCK 0 | WCK 1 | WCK 2 | WCK 3 | WCK 4 | WCK 5 | WCK 6 | WCK 7 |
|---|---|---|---|---|---|---|---|---|---|---|---|---|
| CA0 | 1 | 1 | 1 | 1 | 1 | 1 | 1 | 1 | 1 | 1 | 1 | 1 |
| CA1 | 1 | 1 | 1 | 1 | 1 | 1 | 0 | 1 | 1 | 1 | 1 | 1 |
| CA2 | 1 | 1 | 1 | 1 | 1 | 1 | 1 | 1 | 1 | 1 | 1 | 1 |
| CA3 | 1 | 1 | 1 | 1 | 1 | 1 | 0 | 1 | 1 | 1 | 1 | 1 |
| CA4 | 1 | 1 | 1 | 1 | 1 | 1 | 1 | 1 | 1 | 1 | 1 | 1 |

SP ↓ (at WCK 2), ↓ (at WCK 6)

702 □ CSP command

FIG. 8C

|  | WCK -1 | WCK 0 | WCK 1 | WCK 2 | WCK 3 | WCK 4 |
|---|---|---|---|---|---|---|
| CA0 | 1 | 1 | 1 | 1 | 1 | 1 |
| CA1 | 1 | 1 | 0 | 1 | 1 | 1 |
| CA2 | 1 | 1 | 1 | 1 | 1 | 1 |
| CA3 | 1 | 0 | 1 | 1 | 1 | 1 |
| CA4 | 1 | 1 | 1 | 1 | 1 | 1 |

800

☐ CSP command

− No error after CA parity check

FIG. 10

|      | WCK -3 | WCK -2 | WCK -1 | WCK 0 | WCK 1 | WCK 2 | WCK 3 | WCK 4 |
|------|--------|--------|--------|-------|-------|-------|-------|-------|
| CA0  | 1      | 1      | 1      | 1     | 1     | 1     | 1     | 1     |
| CA1  | 1      | 1      | 1      | 1     | 0     | 1     | 1     | 1     |
| CA2  | 1      | 1      | 1      | 1     | 1     | 1     | 1     | 1     |
| CA3  | 1      | 1      | 1      | 0     | 1     | 1     | 1     | 1     |
| CA4  | 1      | 1      | 1      | 1     | 1     | 1     | 1     | 1     |

SP ↓ (at WCK 0)

907 | 911

☐ CSP command

FIG. 18

|  | WCK n | WCK n+1 | WCK n+2 | WCK n+3 |
|---|---|---|---|---|
| CA0 | 1 | 1 | 1 | 1 |
| CA1 | 1 | 1 | 1 | 1 |
| CA2 | 1 | 1 | 1 | 1 |
| CA3 | 0 | 0 | 0 | 1 |
| CA4 | 1 | 1 | 1 | 1 |

— EB

□ ERROR PATTERN

|  | WCK 0 | WCK 1 | WCK 2 | WCK 3 |
|---|---|---|---|---|
| CA0 | 0 | 0 | 0 | 1 |
| CA1 | 1 | 1 | 1 | 1 |
| CA2 | 1 | 1 | 1 | 1 |
| CA3 | 1 | 1 | 1 | 1 |
| CA4 | 1 | 1 | 1 | 1 |

ERROR PATTERN

|  | WCK 0 | WCK 1 | WCK 2 | WCK 3 |
|---|---|---|---|---|
| CA0 | 1 | 1 | 1 | 1 |
| CA1 | 0 | 0 | 0 | 1 |
| CA2 | 1 | 1 | 1 | 1 |
| CA3 | 1 | 1 | 1 | 1 |
| CA4 | 1 | 1 | 1 | 1 |

ERROR PATTERN

|  | WCK 0 | WCK 1 | WCK 2 | WCK 3 |
|---|---|---|---|---|
| CA0 | 1 | 1 | 1 | 1 |
| CA1 | 1 | 1 | 1 | 1 |
| CA2 | 0 | 0 | 0 | 1 |
| CA3 | 1 | 1 | 1 | 1 |
| CA4 | 1 | 1 | 1 | 1 |

ERROR PATTERN

|     | WCK 0 | WCK 1 | WCK 2 | WCK 3 |
|-----|-------|-------|-------|-------|
| CA0 | 1 | 1 | 1 | 1 |
| CA1 | 1 | 1 | 1 | 1 |
| CA2 | 1 | 1 | 1 | 1 |
| CA3 | 1 | 1 | 1 | 1 |
| CA4 | 0 | 0 | 0 | 1 |

ERROR PATTERN

|      | WCK 0 | WCK 1 | WCK 2 | WCK 3 |
|------|-------|-------|-------|-------|
| CA0  | 0     | 0     | 1     | 1     |
| CA1  | 1     | 1     | 1     | 1     |
| CA2  | 1     | 1     | 1     | 1     |
| CA3  | 1     | 1     | 1     | 1     |
| CA4  | 1     | 1     | 1     | 1     |

ERROR PATTERN

|  | WCK 0 | WCK 1 | WCK 2 | WCK 3 |
|---|---|---|---|---|
| CA0 | 1 | 1 | 1 | 1 |
| CA1 | 1 | 1 | 1 | 1 |
| CA2 | 1 | 1 | 1 | 1 |
| CA3 | 1 | 1 | 1 | 1 |
| CA4 | 0 | 0 | 1 | 1 |

ERROR PATTERN

| | WCK 0 | WCK 1 | WCK 2 | WCK 3 |
|---|---|---|---|---|
| CA0 | 0 | 1 | 1 | 1 |
| CA1 | 1 | 1 | 1 | 1 |
| CA2 | 1 | 1 | 1 | 1 |
| CA3 | 1 | 1 | 1 | 1 |
| CA4 | 1 | 1 | 1 | 1 |

ERROR PATTERN

| | WCK 0 | WCK 1 | WCK 2 | WCK 3 |
|---|---|---|---|---|
| CA0 | 1 | 1 | 1 | 1 |
| CA1 | 1 | 1 | 1 | 1 |
| CA2 | 0 | 1 | 1 | 1 |
| CA3 | 1 | 1 | 1 | 1 |
| CA4 | 1 | 1 | 1 | 1 |

ERROR PATTERN

|  | WCK 0 | WCK 1 | WCK 2 | WCK 3 |
|---|---|---|---|---|
| CA0 | 1 | 1 | 1 | 1 |
| CA1 | 1 | 1 | 1 | 1 |
| CA2 | 1 | 1 | 1 | 1 |
| CA3 | 1 | 1 | 1 | 1 |
| CA4 | 0 | 1 | 1 | 1 |

ERROR PATTERN

FIG. 24

| | WCK 0 | WCK 1 | WCK 2 | WCK 3 | WCK 4 | WCK 5 | WCK 6 | WCK 7 | WCK 8 | WCK 9 | WCK 10 | WCK 11 | WCK 12 | ... | WCK 64 | WCK 65 | WCK 66 | WCK 67 | WCK 68 | WCK 69 | WCK 70 | WCK 71 | WCK 72 | WCK 73 | WCK 74 | WCK 75 | WCK 76 |
|---|---|---|---|---|---|---|---|---|---|---|---|---|---|---|---|---|---|---|---|---|---|---|---|---|---|---|---|
| CA0 | 1 | 1 | 1 | 0 | 1 | 1 | 1 | 0 | 1 | 0 | 1 | 1 | 1 | | 1 | 0 | 1 | 1 | 1 | 0 | 1 | 0 | 1 | 1 | 1 | 0 | 1 |
| CA1 | 1 | 1 | 1 | 1 | 0 | 1 | 0 | 1 | 0 | 1 | 0 | 1 | 0 | | 0 | 1 | 0 | 1 | 0 | 1 | 0 | 1 | 0 | 1 | 0 | 1 | 0 |
| CA2 | 1 | 1 | 1 | 1 | 1 | 0 | 1 | 0 | 1 | 1 | 1 | 0 | 1 | | 1 | 1 | 1 | 0 | 1 | 0 | 1 | 1 | 1 | 0 | 0 | 0 | 0 |
| CA3 | 1 | 1 | 1 | 1 | 1 | 1 | 1 | 1 | 1 | 1 | 1 | 1 | 1 | | 1 | 1 | 1 | 1 | 0 | 1 | 0 | 1 | 0 | 1 | 0 | 1 | 0 |
| CA4 | 1 | 1 | 1 | 0 | 1 | 0 | 1 | 1 | 1 | 0 | 1 | 0 | 1 | | 1 | 0 | 1 | 0 | 1 | 1 | 1 | 0 | 1 | 0 | 0 | 1 | 1 |

☐ ERROR PATTERN

MEMORY DEVICE AND METHOD FOR SYNCHRONIZING COMMAND START POINT (CSP)

CROSS-REFERENCE TO RELATED APPLICATIONS

This application claims priority to Korean Patent Application Nos. 10-2023-0014444, filed on Feb. 2, 2023, 10-2023-0057365, filed on May 2, 2023, and 10-2023-0126401, filed on Sep. 21, 2023, in the Korean Intellectual Property Office, the disclosures of which are incorporated by reference herein in their entireties.

BACKGROUND

The present disclosure relates to semiconductor memory devices, and more particularly, to a memory device that synchronizes a command start point (CSP) with a clock by performing a command address (CA) parity checking operation and a method of operating the same.

Due to demands for increased operating speed, increased data capacity, and decreased power consumption of electronic systems, semiconductor memories that may be accessed faster, store more data, and consume less power are continuously being developed. A semiconductor memory is generally controlled by providing commands, addresses, and clocks to a memory device. Various commands, addresses, and clocks may be provided by, for example, a memory controller. Commands may control the memory device to perform various memory operations, e.g., a read operation for retrieving data from the memory device and a write operation for storing data in the memory device. Data associated with commands may be provided between the memory controller and the memory device at known timings relative to reception and/or transmission by the memory device.

A clock (e.g., WCK) provided to the memory device may be used to generate an internal clock signal that controls timings of various internal circuits during a memory operation. The memory device may capture signals received from the memory controller in response to a WCK clock, e.g., a command address CA signal, data DQ, etc., and synchronize data DQ to be transmitted to the memory controller with a clock signal (e.g., RCK). It is important for the memory device to accurately capture transmitted signals as the frequency of a WCK clock provided from the memory controller increases in accordance with the demand for a high data transfer rate.

A bus training mode may be provided between the memory controller and the memory device to capture command address CA signals and data DQ based on a WCK clock having a high frequency. The memory controller may perform bus interface training on a CA bus and/or a DQ bus when power is supplied to the memory device or when a specific condition is satisfied. For example, a CA bus training may be performed when the memory device is in a reset state during power-up initialization by using a CA Training Entry (CATE) command, or when a CA parity error occurs.

In CA bus training, the memory controller may transmit a command bus training (CBT) pattern to the memory device through a CA bus, compare an output pattern of the memory device received through a DQ bus with the CBT pattern, adjust the timing of a CA signal carrying a CA pattern until the output pattern becomes identical to the CBT pattern, and determine whether the CA signal is accurately captured by the memory device. For example, the memory controller may determine the CA signal is accurately captured by the memory device when output pattern becomes identical to the CBT pattern. When the CA bus training is completed, the memory controller may issue a command start point (CSP) command synchronized with a WCK clock to the memory device to instruct the memory device to prepare for a memory operation.

When the memory controller issues a command including a CSP command to the memory device, the memory controller may provide command operands, for example, for 4*tWCK, which corresponds to four WCK clock cycles. In this regard, command operands may be provided to a CA signal (e.g., CA[4:0]) line at a first rising edge, a second rising edge, a third rising edge, and a fourth rising edge of a WCK clock. Four WCK clock cycles in which command operands are applied may be aligned with a command boundary (e.g., CB of FIG. 4B). The memory controller may issue a CSP command to the memory device to prepare the memory device for a memory operation after the memory device exits a sleep state.

The memory device may perform a CA parity (CAPAR) checking operation in order to improve signal integrity of a CA signal line. For example, during the CAPAR checking operation, a parity is generated by calculating the sum of CA[4:0] signal bits for a CB recognized as 4 WCK clock cycles in which a CSP command is applied, it is determined whether a calculated parity value is, for example, an even value, and, when the calculated parity value is not an even value, the memory controller is notified that there is an error in the CA[4:0] signal bits indicating the CSP command. When there is an error in the CSP command, the memory controller may perform CA bus training with the memory device again and, upon completion of the CA bus training, issue a CSP command to the memory device again. At this time, the memory device may recognize that a subsequent command will be input for every CB based on a first rising edge of a WCK clock in which operands of a CSP command are input and accurately decode command operands of a subsequent command to perform a memory operation.

However, when the memory device receives a CSP command after exiting from the sleep state, an inactive WCK clock of which toggling was stopped in the sleep state may be activated and toggled again. In this regard, the memory device is unable to accurately determine a rising edge of which of a rising edge of the clock cycle among the toggling WCK clock cycles is aligned with the CSP of a CSP command. Furthermore, when there is an error in a CSP command and the error is not found through a CAPAR checking operation, the memory controller is unable to know the error in the CSP command. Therefore, the memory controller transmits an erroneous subsequent command to the memory device, and the memory device decodes operands of the erroneous subsequent command, resulting in a malfunction.

SUMMARY

One or more example embodiments provide a memory device that performs a command address parity (CAPAR) checking operation to synchronize a command start point (CSP) command with a clock signal and a method of operating the same.

According to an aspect of an example embodiment, a memory device includes: a control logic circuit configured to receive command address (CA) signals and control an operation of the memory device; a clock circuit configured receive a clock signal and divide the clock signal to generate first to fourth phase clock signals that are respectively synchronized with first to fourth rising edges of the CA signals indicating a CSP command, wherein the first to fourth rising edges of the CA signals constitute a command window; and a CA parity circuit configured to perform a CAPAR checking operation on the CSP command, wherein the CAPAR checking operation includes a plurality of operations respectively corresponding to rolling windows in which the command window is delayed by one clock cycle of the clock signal.

According to another aspect of an example embodiment, a memory device includes: a control logic circuit configured to receive CA signals and control an operation of the memory device; a clock circuit configured receive a clock signal and divide the clock signal to generate first to fourth phase clock signals that are respectively synchronized with first to fourth rising edges of the CA signals indicating an error pattern, wherein the first to fourth rising edges of the CA signals constitute a command window; and a CA parity circuit configured to perform a CAPAR checking operation on the error pattern, wherein the CAPAR checking operation includes a plurality of operations respectively corresponding to rolling windows in which the command window is delayed by one clock cycle of the clock signal.

According to another aspect of an example embodiment, a method of operating a memory device includes: receiving a clock signal; dividing the clock signal to generate first to fourth phase clock signals that are respectively synchronized with first to fourth WCK rising edges of sampling CA signals, wherein the first to fourth rising edges of the CA signals constitute a command window; receiving the CA signals from a memory controller outside the memory device; performing a CAPAR checking operation on the CA signals, wherein the CAPAR checking operation includes a plurality of operations respectively corresponding to rolling windows in which the command window is delayed by one clock cycle of the clock signal; and transmitting an error signal indicating a CA parity error is identified in the CAPAR checking operation to the memory controller.

BRIEF DESCRIPTION OF THE DRAWINGS

The above and other aspects will be more apparent from the following description of example embodiments taken in conjunction with the accompanying drawings, in which:

FIGS. 5A, 5B, 6A and 6B are diagrams showing commands according to example embodiments;

FIGS. 7A, 7B, 7C and 7D are diagrams showing various cases in which a command start point (CSP) command is input, according to example embodiments;

FIGS. 8A, 8B and 8C are diagrams showing a command address parity (CAPAR) checking method according to example embodiments;

FIG. 10 is a diagram showing a method of finding a CSP command error by using the rolling window-based CAPAR checking method of FIG. 9;

FIG. 18 is a diagram showing an error pattern according to example embodiments;

FIG. 24 is a diagram showing an error pattern according to example embodiments;

DETAILED DESCRIPTION

Embodiments will be described with reference to the accompanying drawings. Each example embodiment provided in the following description is not excluded from being associated with one or more features of another example or another example embodiment also provided herein or not provided herein but consistent with the present disclosure.

Figure 1:
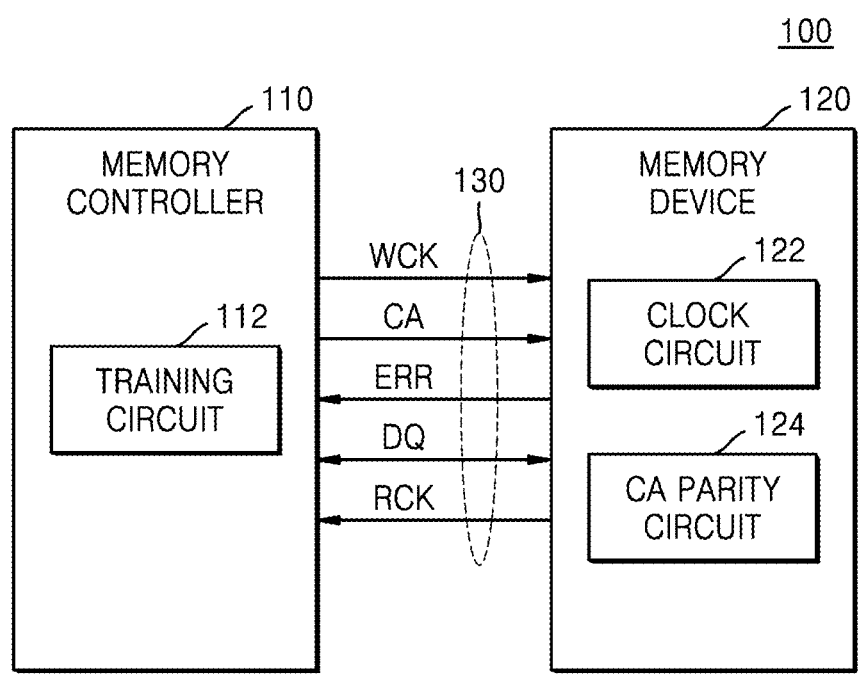
FIG. 1 is a block diagram showing a memory system according to example embodiments.

FIG. 1 is a block diagram showing a memory system according to example embodiments.

Referring to FIG. 1, a memory system 100 includes a memory controller 110 and a memory device 120. The memory system 100 may support data communication between the memory controller 110 and the memory device 120 by using a clock signal WCK. The memory system 100 may be implemented to be included in a personal computer (PC) or a mobile electronic device. The mobile electronic device may be implemented as a laptop computer, a mobile phone, a smartphone, a tablet PC, a personal digital assistant (PDA), an enterprise digital assistant (EDA), a digital still camera, a digital video camera, a portable multimedia player (PMP), a personal navigation device or a portable navigation device (PND), a handheld game console, a mobile internet device (MID), a wearable computer, an internet of things (IoT) device, an internet of everything (IoE) device, or a drone.

The memory controller 110 may be a semiconductor device that performs a memory control function and may be a component included in an apparatus implemented by an integrated circuit (IC), a system-on-chip (SoC), an application processor (AP), a mobile AP, a chipset, or a set of chips. An AP may include a memory controller, random access memory (RAM), a central processing unit (CPU), a graphics processing unit (GPU), and/or a modem.

The memory device 120 may be implemented by a volatile memory device. The volatile memory device may include RAM, dynamic RAM (DRAM), or static RAM (SRAM) but is not limited thereto. For example, the memory device 120 may correspond to double data rate synchronous dynamic random access memory (DDR SDRAM), low power double data rate LPDD (LPDDR) SDRAM, graphics double data rate (GDDR) SDRAM, Rambus dynamic random access memory (RDRAM), etc. Alternatively, the memory device 120 may be implemented by high bandwidth memory (HBM).

In addition, the memory device 120 may also be implemented by a non-volatile memory device. For example, the memory device 120 may be implemented by a resistive memory like phase change RAM (PRAM), magnetic RAM (MRAM), or resistive RAM (RRAM). Hereinafter, for convenience of explanation, the memory device 120 is shown as a single semiconductor chip, However, n (n is a non-zero whole number) memory devices may actually be included.

The memory device 120 may be coupled to a bus 130 carrying a clock signal WCK, a command address CA, data DQ, and an error signal ERR. The memory controller 110 and the memory device 120 may communicate with each other through various buses. For example, the command address CA may be received by the memory device 120 through a CA bus 130, and the data DQ may be provided between the memory controller 110 and the memory device 120 through a DQ bus 130. Various clock signals may be provided between the memory controller 110 and the memory device 120 through a clock bus 130. The clock bus 130 may include signal lines for providing clock signals received by the memory device 120 (e.g., WCK_t and WCK_c, FIG. 4) and read clock signals (e.g., RCK_t and RCK_c) provided by the memory device 120 to the memory controller 110. Each bus 130 may include one or more signal lines on which signals are provided.

Clock signals WCK_t and WCK_c provided to the memory device 120 by the memory controller 110 are used for timings of providing and receiving the command address CA and the data DQ. A clock signal WCK may be used by the memory device 120 to generate an internal clock signal (e.g., CLK(int), FIG. 5A) for timings of operating internal circuits of the memory device 120. The clock signals WCK_t and WCK_c are complementary with each other, and clock signals RCK_t and RCK_c are complementary with each other. Clock signals are complementary with each other when the rising edge of a first clock signal coincides with the falling edge of a second clock signal and the rising edge of the second clock signal coincides with the falling edge of the first clock signal. Hereinafter, for convenience of description, the clock signals WCK_t and WCK_c may be referred to as clock signals WCK and the clock signals RCK_t and RCK_c may be referred to as clock signals RCK.

The memory controller 110 may provide a command to the memory device 120 to perform a memory operation. Non-limiting examples of memory commands may include timing commands (e.g., command start point (CSP) commands) for controlling timings of various operations, access commands for accessing a memory like read commands (e.g., RD commands) for performing read operations and write commands (e.g., WR commands) for performing write operations, mode register set (MRS) commands (e.g., MRS commands), etc.

During a read operation, when a read command and an associated address are provided to the memory device 120 by the memory controller 110, the memory device 120 may receive the read command and the associated address and perform a read operation, thereby outputting read data DQ from a memory location corresponding to the associated address. The read data DQ may be provided to the memory controller 110 by the memory device 120 according to a read latency (RL) value related to reception of a read command. The RL value may be programmed into a MRS 210 (FIG. 2) of the memory device 120 by the memory controller 110. The MRS 210 included in the memory device 120 may be programmed with information for setting various operation modes and/or for selecting features for a memory operation.

When preparing the memory device 120 to provide the read data DQ to the memory controller 110, the memory controller 110 may provide an active clock signal WCK to the memory device 120. The clock signal WCK may be used by the memory device 120 to generate a clock signal RCK. A clock signal is activated when the clock signal is periodically toggled between a low clock level and a high clock level. On the contrary, when a clock signal maintains a constant clock level and is not toggled, the clock signal is deactivated. The clock signal RCK may be provided to the memory controller 110 by the memory device 120 that has performed a read operation for timing of providing read data to the memory controller 110. The memory controller 110 may use the clock signal RCK to receive the read data DQ.

During a write operation, when a write command and an associated address are provided by the memory controller 110 to the memory device 120, the memory device 120 may receive the write command and the associated address and perform a write operation, thereby writing write data DQ from the memory controller 110 to a memory location corresponding to the associated address. The write data DQ is provided to the memory device 120 by the memory controller 110 according to a write latency (WL) value related to reception of a write command. The WL value may be programmed into the MRS 210 of the memory device 120 by the memory controller 110.

When preparing the memory device 120 to receive the write data DQ from the memory controller 110, the memory controller 110 may provide an active clock signal WCK to the memory device 120. The write data DQ may be provided by the memory controller 110, the memory device 120 may receive the write data DQ according to the clock signal WCK, and the write data DQ may be written into a memory location corresponding to a memory address.

To accurately perform a memory operation according to these operating timings, the memory controller 110 may include a training circuit 112 that performs memory training on the memory device 120. The training circuit 112 may perform memory core parameter training associated with a memory core and/or peripheral circuit parameter training for peripheral circuits other than the memory core in the memory device 120 in response to a training command. The training circuit 112 may become a training subject and determine optimal parameters values for memory core parameters and/or peripheral circuit parameters. Although it is described that the training circuit 112 is included in the memory controller 110, example embodiments are not limited thereto and the training circuit 112 may be included in the memory device 120, such that the memory device 120 may be the subject of performing a memory training.

The training circuit 112 may perform CA bus training on the memory device 120. The training circuit 112 may transmit a CBT pattern to the memory device 120 through the CA bus 130, compare an output pattern of the memory device 120 received through the DQ bus 130 with the CBT pattern, adjust the timing of a CA signal carrying the CBT pattern until the output pattern becomes identical to the CBT pattern, and determine whether the CA signal is accurately captured by the memory device 120. For example, the training circuit 112 may determine the CA signal is accurately captured when then output pattern becomes identical to the CBT pattern. When the CA bus training is completed, the memory controller 110 may issue a CSP command synchronized with the clock signal WCK to the memory device 120. The memory device 120 may recognize the rising edge of the clock signal WCK at which the CSP command is applied as the start point of the CSP command (e.g., starting point (SP) of FIGS. 7A to 7D), and every four cycles of the clock signal WCK in which the command operands of the CSP command are applied may be aligned with command boundaries (e.g., 700 to 703 in FIGS. 7A to 7D).

The memory device 120 may include a clock circuit 122 and a CA parity circuit 124. The clock circuit 122 may buffer the clock signal WCK received by the memory device 120 and generate multi-phase clock signals that are phase-divided from a buffered clock signal WCK. The multi-phase clock signals may include first to fourth phase clock signals WCK0, WCK90, WCK180, and WCK270 (FIG. 4B) having a phase relationship of 90 degrees (0 degrees, 90 degrees, 180 degrees, 270 degrees) with respect to one another. The first to fourth phase clock signals WCK0, WCK90, WCK180, and WCK270 may be synchronized with a first rising edge WCKn, a second rising edge WCKn+1, a third rising edge WCKn+2, and a fourth rising edge WCKn+3, respectively, during four cycles of the clock signal WCK identified by command boundaries CB of the CSP command described below with reference to FIG. 4B.

The CA parity circuit 124 may perform a CA parity (CAPAR) checking operation on CA signals received by the memory device 120. For example, the CAPAR checking operation may generate a parity value by performing a calculation of summing CA[4:0] signal bits during four cycles of the clock signal WCK in which the CSP command is applied, may check whether a calculated parity value is, for example, an even value, and, when the calculated parity value is not an even value, may determine that there is an error in the CA[4:0]) signal bits representing the CSP command. A CA parity error found by the CAPAR checking operation may be notified to the memory controller 110 by using an error signal ERR. When the error signal ERR indicating that there is a CSP command error (CA parity error) is transmitted, the memory controller 110 may perform a CA bus training on the memory device 120 again and, upon completion thereof, re-issue (i.e., issue again) a CSP command to the memory device 120. At this time, the memory device 120 may expect that a subsequent command will be input at a command boundary CB with which every four cycles of the clock signal WCK is aligned based on the first rising edge WCKn of the clock signal WCK in which the operands of a CSP command are input and may decode the command operands of a subsequent command, thereby performing a memory operation.

Figure 2:
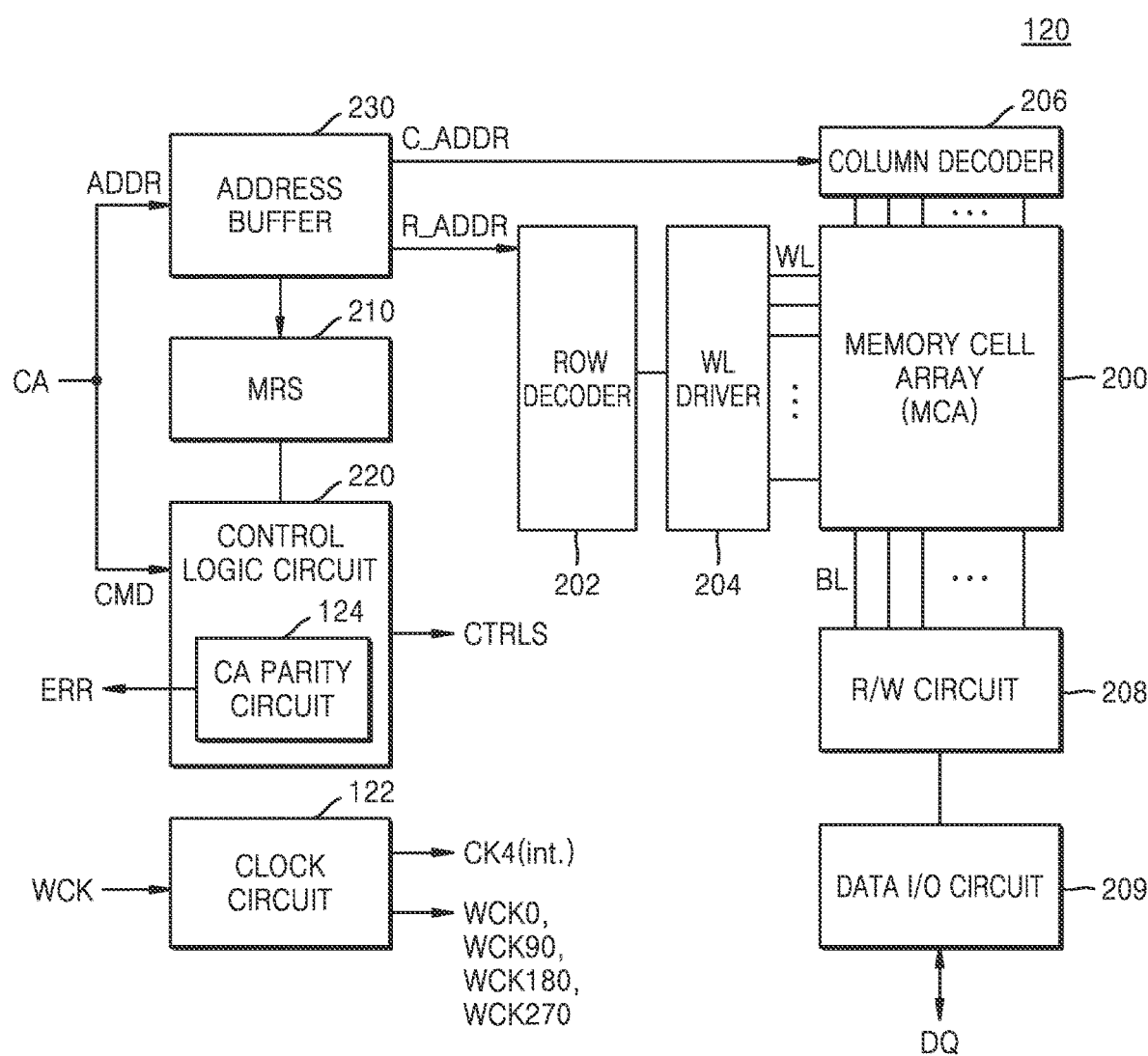
FIG. 2 is a block diagram showing a memory device according to example embodiments.

FIG. 2 is a block diagram showing a memory device according to example embodiments.

Referring to FIGS. 1 and 2, the memory device 120 may include a memory cell array 200, a row decoder 202, a word line driver 204, a column decoder 206, a read/write circuit 208, a data input/output circuit 209, an address buffer 230, the MRS 210, the clock circuit 122 and a control logic circuit 220. The control logic circuit 220 may include the CA parity circuit 124 that performs a CAPAR checking operation.

The memory cell array 200 includes a plurality of banks, and each bank includes a plurality of memory cells provided in a matrix form having rows and columns. The memory cell array 200 includes a plurality of word lines WL and a plurality of bit lines BL connected to memory cells. The plurality of word lines WL may be connected to memory cells in rows, and the plurality of bit lines BLm may be connected to memory cells in columns.

The row decoder 202 may select any one of the word lines WL connected to the memory cell array 200. The row decoder 202 may decode a row address R_ADDR received through the CA bus 130 and the address buffer 230, select any one word line WL corresponding to the row address R_ADDR, and connect the selected word line WL to the word line driver 204 that activates the selected word line WL. The column decoder 206 may select predetermined bit lines BL from among the bit lines BL of the memory cell array 200. The column decoder 206 may generate a column select signal CSL by decoding a column address C_ADDR received from the address buffer 230 and connect bit lines BL selected by the column select signal to the read/write circuit 208.

The read/write circuit 208 may include read data latches for storing read data of the bit lines BL selected by the column select signal CSL and a write driver for writing write data to the memory cell array 200. Read data stored in the read data latches of the read/write circuit 208 may be provided to the DQ bus 130 through a data output driver of the data input/output circuit 209 and transmitted to the memory controller 110. Write data may be applied to the memory cell array 200 through a data input buffer of the data input/output circuit 209 connected to the DQ bus 130 and through a write driver of the read/write circuit 208.

The clock circuit 122 may receive a clock signal WCK and generate an internal clock signal CK4(int.) and multi-phase clock signals, that is, the first to fourth phase clock signals WCK0, WCK90, WCK180, and WCK270. The internal clock signal CK4(int.) and the first to fourth phase clock signals WCK0, WCK90, WCK180, and WCK270 may be provided to the control logic circuit 220 and used for timings of various operations of internal circuits. The MRS 210 may store information used by the control logic circuit 220 to configure the operation of the memory device 120 to set an operating condition for the memory device 120. The MRS 210 may include a register that stores parameter codes for various operation parameters and control parameters used to set an operating condition of the memory device 120. A parameter code may be received by the memory device 120 through the CA bus 130.

The control logic circuit 220 may receive a command and/or an address through the CA bus 130 and generate control signals CTRLS for controlling an operation timing and/or a memory operation of the memory device 120. The control logic circuit 220 may use the control signals CTRLS to read data from the memory cell array 200 and to write data to the memory cell array 200. The control logic circuit 220 may provide control signals CTRLS to circuits of the memory device 120 to operate as set by operation parameters and control parameters stored in the MRS 210.

The CA parity circuit 124 may perform a CA parity (CAPAR) checking operation on CA signals received by the memory device 120 through the CA bus 130. As a result of the CAPAR checking operation, when there is a CA parity error, an error signal ERR may be transmitted to the memory controller 110. The CA parity circuit 124 is described below with reference to FIG. 12. Below, it is described that the CA parity circuit 124 performs a CAPAR checking operation, but example embodiments are not necessarily limited thereto. For example, the CA parity circuit 124 may correspond to a component included in the control logic circuit 220, and it may be described that the control logic circuit 220 performs a CAPAR checking operation.

Figure 3:
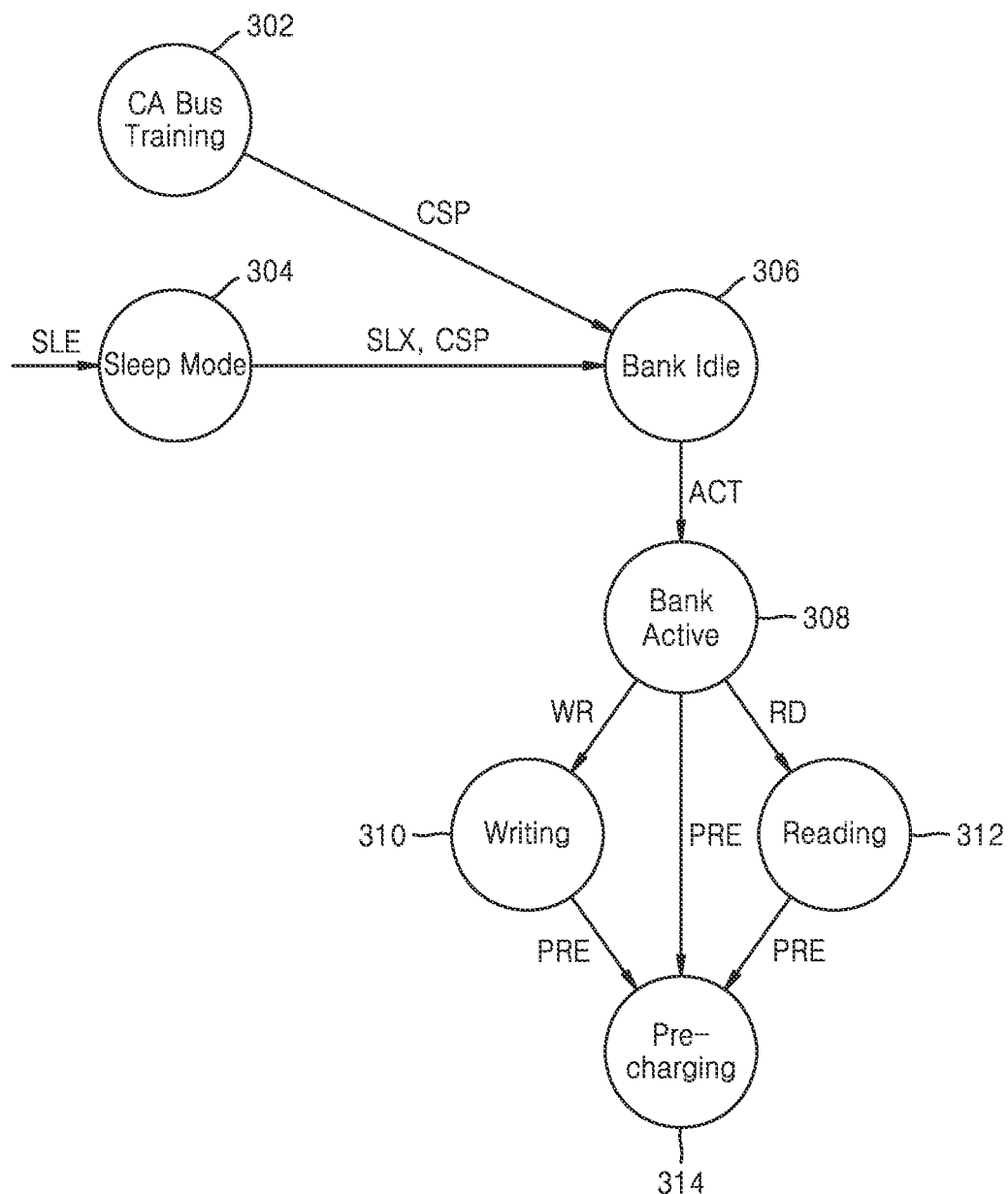
FIG. 3 is a partial state diagram of a memory device according to example embodiments.

FIG. 3 is a partial state diagram of a memory device according to example embodiments.

Referring to FIGS. 1, 2, and 3, the memory device 120 may enter a CA bus training mode 302 after being initialized with stable power. The memory device 120 may perform CA bus training with the memory controller 110 in the CA bus training mode 302 and then await for a CSP command from the memory controller 110. The memory device 120 may enter a sleep mode 304 in response to a sleep entry command SLE of the memory controller 110. While in the sleep mode 304, toggling of the clock signal WCK may be stopped, and thus, the clock signal WCK may be deactivated. Thereafter, the memory device 120 may exit the sleep mode 304 in response to a sleep exit command SLX of the memory controller 110, the clock signal WCK may be activated, and the memory device 120 may await for a CSP command.

When a CSP command is applied, the memory device 120, the memory device 120 may enter a bank idle mode 306 to prepare for a memory operation. The memory device 120 may enter a bank active mode 308 from the bank idle mode 306 in response to the active command ACT of the memory controller 110 and activate a memory cell row of a bank corresponding to a memory address. A bank activated in the bank active mode 308 may enter a write mode 310 in response to a write command WR of the memory controller 110, receive write data DQ according to the clock signal WCK, and write the write data DQ to memory cells corresponding to a memory address. A bank activated in the bank active mode 308 may enter a read mode 312 in response to a read command RD of the memory controller 110, generate a clock signal RCK based on the clock signal WCK, synchronize data DQ read from memory cells corresponding to a memory address with the clock signal RCK, and transmit synchronized data DQ to the memory controller 110. Banks activated in the bank active mode 308, the write mode 310, and/or the read mode 312 may enter a pre-charge mode 314 in response to a pre-charge command PRE of the memory controller 110 and pre-charge an activated memory cell.

As described above, after receiving the CSP command, the memory device 120 may receive a next command (e.g., ACT, WR, RD, PRE, etc.) and perform an operation according to a corresponding command. The CSP command recognized by the memory device 120 is important, because the CSP command becomes a reference for accurately decoding subsequent commands. In example embodiments discussed below, the CA parity circuit 124 and a CAPAR checking method are described to accurately recognize a CSP start point of a command boundary CB with respect to a CSP command.

Figure 4A:
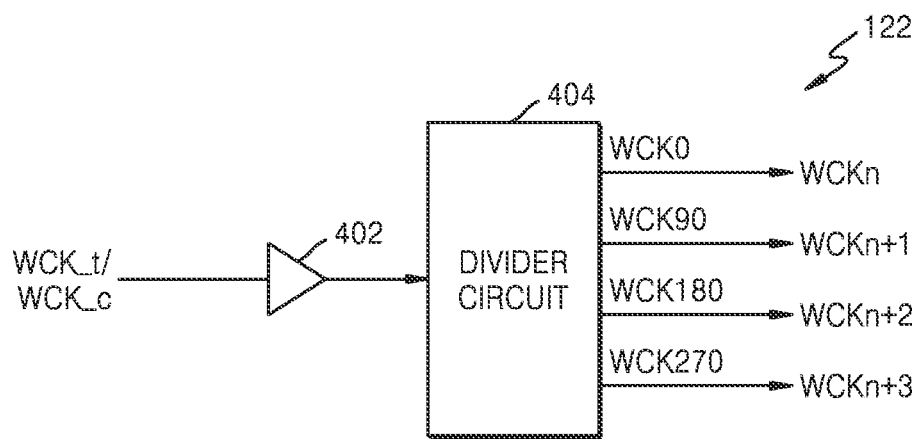
FIG. 4A is a diagram showing a clock circuit according to example embodiments.
Figure 4B:
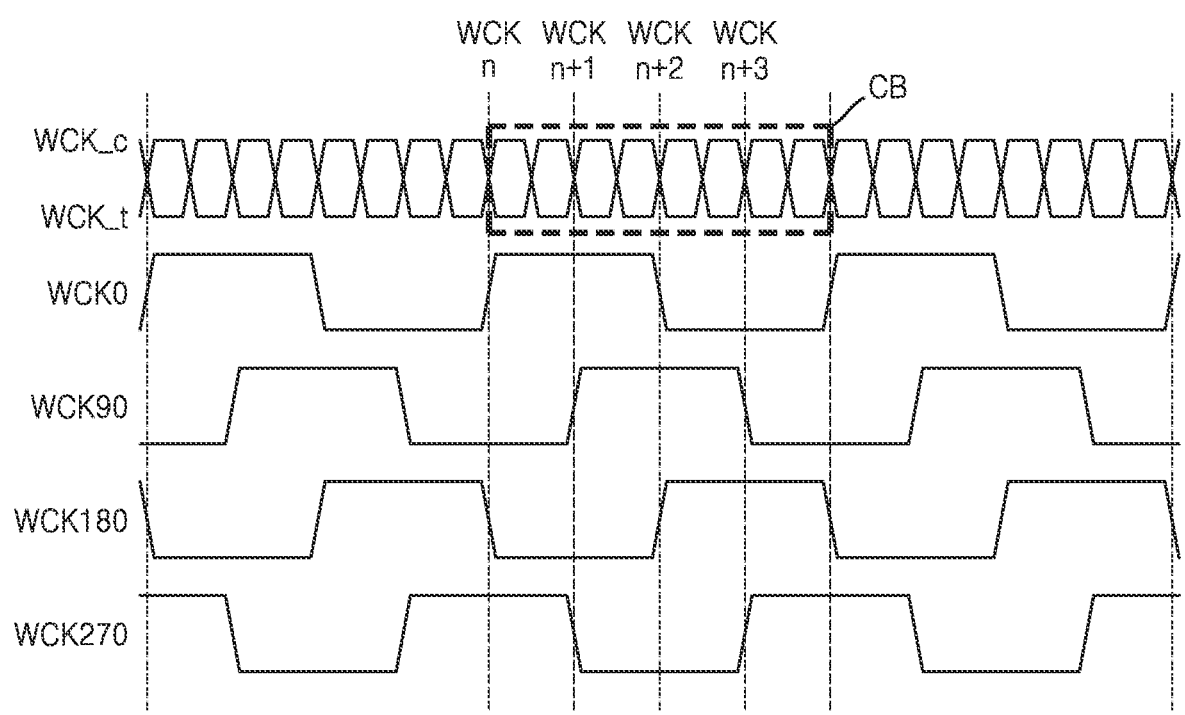
FIG. 4B is a diagram showing clock signals according to example embodiments.

FIG. 4A is a diagram showing a clock circuit according to example embodiments. FIG. 4B is a diagram showing clock signals according to example embodiments.

Referring to FIGS. 1, 2, and 4A, the clock circuit 122 may divide a received clock signal WCK by 4, thereby generating an internal clock signal (e.g., CK4(int) of FIG. 5) for operating timings of internal circuits of the memory device 120. The clock circuit 122 may include a clock buffer 402 and a divider circuit 404. The clock buffer 402 may receive the clock signal WCK applied to memory device 120 and provide a buffered clock signal WCK to the divider circuit 404. The divider circuit 404 may output the first to fourth phase clock signals WCK0, WCK90, WCK180, and WCK270 generated from the buffered clock signal WCK. As shown in FIG. 4B, the second phase clock signal WCK90 may have a phase difference of 90 degrees from the first phase clock signal WCK0, the third phase clock signal WCK180 may have a phase difference of 180 degrees from the first phase clock signal WCK0, and the fourth phase clock signal WCK270 may have a phase difference of 270 degrees from the first phase clock signal WCK0.

In FIG. 4B, four cycles of the clock signal WCK in which operands of a command applied from the memory controller 110 are applied may be aligned with the command boundary CB. Command operands will be applied at the first rising edge WCKn, the second rising edge WCKn+1, the third rising edge WCKn+2, and the fourth rising edge WCKn+3 of the clock signal WCK at the command boundary CB. At the command boundary CB, the first rising edge WCKn of the clock signal WCK may be synchronized with a WCK0 phase clock signal, the second rising edge WCKn+1 may be synchronized with a WCK90 phase clock signal, the third rising edge WCKn+2 may be synchronized with a WCK180 phase clock signal, and the fourth rising edge WCKn+3 may be synchronized with a WCK270 phase clock signal.

When the command boundary CB is precisely aligned, the WCK0 phase clock signal may function identically to the first rising edge WCKn of the command boundary CB. Similarly, the WCK90 phase clock signal may function identically to the second rising edge WCKn+1 of the command boundary CB, the WCK180 phase clock signal may function identically to the third rising edge WCKn+2 of the command boundary CB, and the WCK270 phase clock signal may function identically to the fourth rising edge WCKn+3 of the command boundary CB. Therefore, as shown in FIG. 4A, the WCK0 phase clock signal may be expressed like a WCKn rising edge of the command boundary CB, the WCK90 phase clock signal may be expressed like a WCKn+1 rising edge of the command boundary CB, the WCK180 phase clock signal may be expressed like a WCKn+2 rising edge of the command boundary CB, and the WCK270 phase clock signal may be expressed like a WCKn+3 rising edge of the command boundary CB.

Hereinafter, for convenience of explanation, the WCKn rising edge, the WCKn+1 rising edge, the WCKn+2 rising edge, and the WCKn+3 rising edge of an ideal command boundary CB of a current command may be expressed as a WCK0 rising edge, a WCK1 rising edge, a WCK2 rising edge, and a WCK3 rising edge, respectively. The command boundary CB of a previous command may be expressed as a WCK−4 rising edge, a WCK−3 rising edge, a WCK−2 rising edge, and a WCK−1 rising edge, and the command boundary CB of a next command may be expressed as a rising edge WCK4, a rising edge WCK5, a rising edge WCK6, and a rising edge WCK7. The current command will be described as a CSP command, and the previous command and the next command will be described as No Operation (NOP) commands.

Figure 5A:
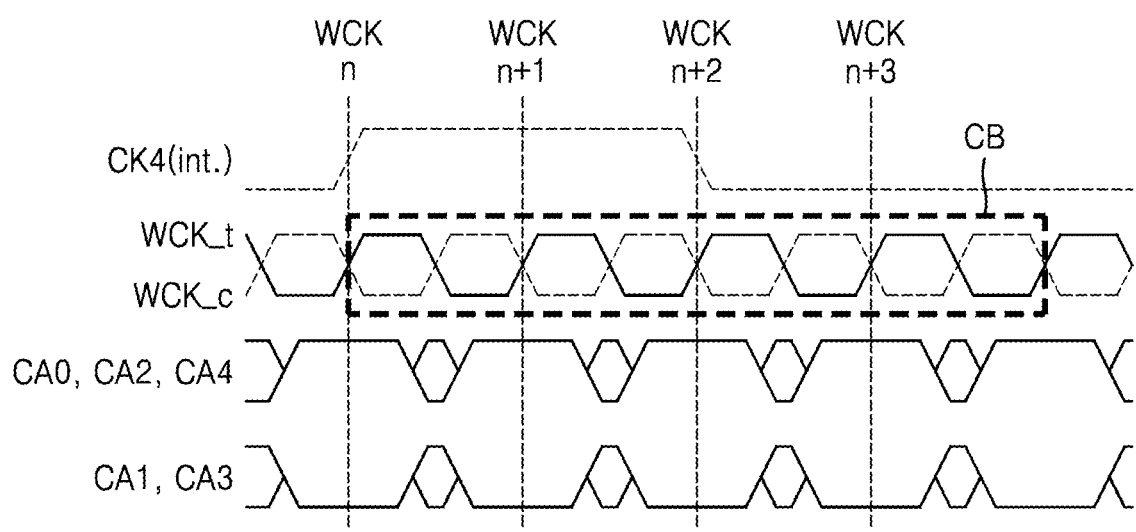
Figure 6A:
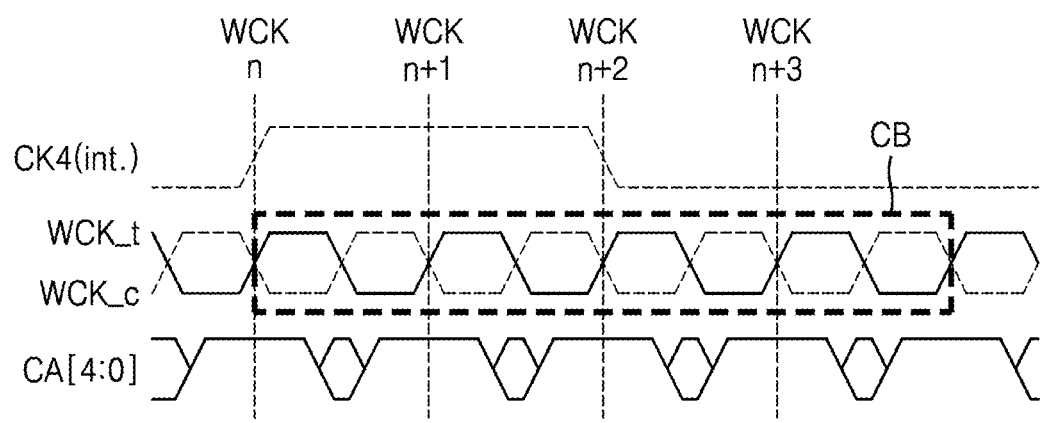

FIGS. 5A to 6B are diagrams showing commands according to example embodiments. FIG. 5A shows a timing diagram related to a CSP command, and FIG. 5B shows a CSP command diagram. FIG. 6A shows a timing diagram related to an NOP command, and FIG. 6B shows a NOP command diagram. In timing diagrams shown below, the horizontal axis and the vertical axis represent time and voltage levels, respectively, and are not necessarily drawn to scale.

Referring to FIGS. 5A and 5B, operands of a CSP command (variables, fields, or values indicating certain aspects) are provided as command address (CA[4:0]) inputs. At the WCKn rising edge of the command boundary CB of the CSP command, logic 1 values may be input as CA0, CA2, and CA4 inputs, and logic 0 values may be input as CA1 and CA3 inputs. Also, logic 1 values may be input as a CA[4:0] input at the WCKn+1 rising edge, the WCKn+2 rising edge, and the WCKn+3 rising edge of the command boundary CB of the CSP command.

Referring to FIGS. 6A and 6B, operands of an NOP command are provided as CA[4:0] inputs. Also, logic 1 values may be input as a CA[4:0] input at the WCKn rising edge, the WCKn+1 rising edge, the WCKn+2 rising edge, and the WCKn+3 rising edge of the command boundary CB of the NOP command.

FIGS. 7A to 7D are diagrams showing various cases in which a CSP command is input, according to example embodiments. FIGS. 7A to 7D show CSPs of subsequent commands based on a CSP SP with which the command boundary of the CSP command is accurately aligned.

FIG. 7A shows a command boundary 700 in which CA[4:0] operands of a CSP command are aligned with the WCK0 rising edge, the WCK1 rising edge, the WCK2 rising edge, and the WCK3 rising edge. Because the CSP SP at the command boundary 700 of the CSP command is the WCK0 rising edge, the CSP of a next command may be recognized as the WCK4 rising edge (i.e., four rising edges after the CSP SP). The WCK0 rising edge of the command boundary 700 will be found by a first CSP checker (i.e., first CSP checking circuit) 1500 and a first multiplexer (MUX) 1600 to be described below with reference to FIGS. 15 and 16.

FIG. 7B shows a command boundary 701 in which CA[4:0] operands of a CSP command are aligned at the WCK1 rising edge, the WCK2 rising edge, the WCK3 rising edge, and the WCK4 rising edge. Because the CSP SP at the command boundary 701 of the CSP command is the WCK1 rising edge, the CSP of a next command may be recognized as the WCK5 rising edge (i.e., four rising edges after the CSP SP). The WCK1 rising edge of the command boundary 701 will be found by a second CSP checker (i.e., second CSP checking circuit) 1501 and a second MUX 1601 to be described below with reference to FIGS. 15 and 16.

FIG. 7C shows a command boundary 702 in which CA[4:0] operands of a CSP command are input at the WCK2 rising edge, the WCK3 rising edge, the WCK4 rising edge, and the WCK5 rising edge. Because the CSP SP at the command boundary 702 of the CSP command is the WCK2 rising edge, the CSP of a next command may be recognized as the WCK6 rising edge (i.e., four rising edges after the CSP SP). The WCK2 rising edge of the command boundary 702 will be found by a third CSP checker (i.e., third CSP checking circuit) 1502 and a third MUX 1602 to be described below with reference to FIGS. 15 and 16.

Figure 7D:

FIG. 7D shows a command boundary 703 in which CA[4:0] operands of a CSP command are input at the WCK3 rising edge, the WCK4 rising edge, the WCK5 rising edge, and the WCK6 rising edge. Because the CSP SP at the command boundary 703 of the CSP command is the WCK3 rising edge, the CSP of a next command may be recognized as the WCK7 rising edge (i.e., four rising edges after the CSP SP). The WCK3 rising edge of the command boundary 703 will be found by a fourth CSP checker (i.e., fourth CSP checking circuit) 1503 and a fourth MUX 1603 to be described below with reference to FIGS. 15 and 16.

Figure 8A:
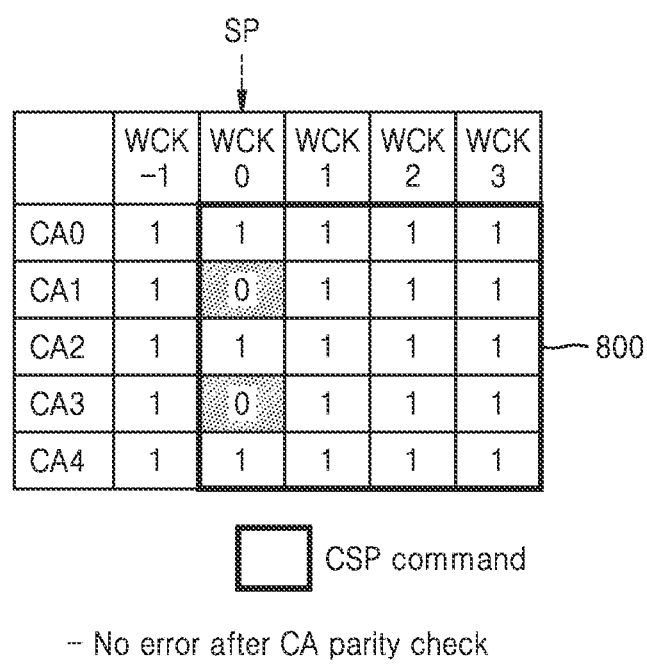
Figure 8B:
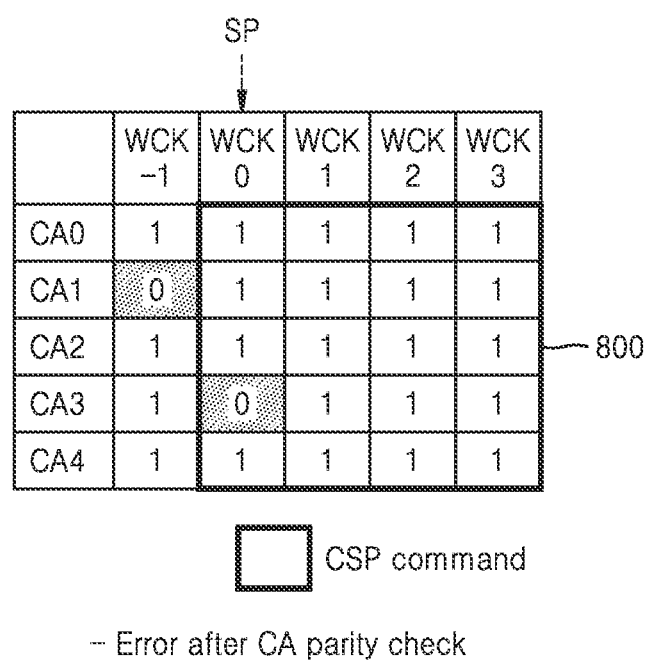

FIGS. 8A to 8C are diagrams showing a command address parity (CAPAR) checking method according to example embodiments.

FIG. 8A shows a command boundary 800 in which CA[4:0] operands of a CSP command are recognized as being input at the WCK0 rising edge, the WCK1 rising edge, the WCK2 rising edge, and the WCK3 rising edge. According to the CAPAR checking method for the command boundary 800, it may be calculated whether the total number of logic 0 bit values from among input values of CA[4:0] operands applied to each of the WCK0 rising edge, the WCK1 rising edge, the WCK2 rising edge, and the WCK3 rising edge is an even value. When a CAPAR checking result is an even value, the CSP command of the command boundary 800 may be determined as a valid command without an error. According to another example embodiment, a CAPAR may be checked for the command boundary 800 by calculating whether the total number of logic 1 bit values from among input values of the CA[4:0] operands is an even value.

FIGS. 8B and 8C show cases in which a CSP command error occurs in the command boundary 800. FIG. 8B shows a case in which a CSP command error occurs, because CA1 operands of a CSP command are input at a WCK−1 rising edge, that is, one WCK clock cycle ahead of the CSP SP of the CSP command (i.e., the WCK0 rising edge). FIG. 8C shows a case in which a CSP command error occurs, because CA1 operands of a CSP command are input at a WCK1 rising edge, that is, one WCK clock cycle later than the CSP SP of the CSP command (i.e., the WCK0 rising edge).

In FIG. 8B, as a result of checking CAPAR for the command boundary 800, the total number of logic 0 bit values from among CA[4:0] input values indicates an odd value (i.e., 1). This indicates that there is an error in the CA[4:0] operands of the CSP command at the command boundary 800. A CA parity error may be transmitted to the memory controller 110 through a line for an error signal ERR (FIG. 1).

The memory controller 110 may determine that the CSP command is invalid based on the error signal ERR and may retry CA bus training for the memory device 120. The memory controller 110 may transmit a CBT pattern to the memory device 120 through the CA bus 130, compare an output pattern of the memory device received through the DQ bus 130 with the CBT pattern, adjust the timing of a CA signal carrying the CBT pattern until the output pattern becomes identical to the CBT pattern, and determine whether the CA signal is accurately captured by the memory device. For example, the memory controller 110 may determine the CA signal is accurately captured by the memory device 120 when then output pattern becomes identical to the CBT pattern. When the CA bus training is completed, the memory controller 110 may issue a CSP command synchronized with the clock signal WCK to the memory device 120. The memory device 120 may receive, for example, a CSP command synchronized with the WCK0 rising edge, recognize that the CSP SP of a subsequent command will be the WCK4 rising edge, a WCK8 rising edge, and a WCK12 rising edge (i.e., at intervals of four rising edges of the clock signal WCK), and decode a command applied at the WCK4 rising edge, the WCK8 rising edge, and the WCK12 rising edge, thereby performing an operation according to the corresponding command.

In FIG. 8C, as a result of checking CAPAR for the command boundary 800, the total number of logic 0 bit values from among CA[4:0] input values is calculated as an even value. Despite an error in the CA[4:0] operands of the CSP command at the command boundary 800, the result of checking CAPAR indicates no error. In this case, the memory controller 110 may determine that the CSP command is valid because there is no CA parity error for the CSP command and may issue a subsequent command synchronized with the clock signal WCK to the memory device 120. The memory device 120 recognizes that the CSP SP of the subsequent command will be applied at the WCK4 rising edge, the WCK8 rising edge, and the WCK12 rising edge and decodes command operands applied at the WCK4 rising edge, the WCK8 rising edge, and the WCK12 rising edge. However, this is decoding of an invalid command, and thus, the memory device 120 may malfunction. To avoid the malfunction, a rolling window-based CAPAR checking method may be used.

Figure 9:
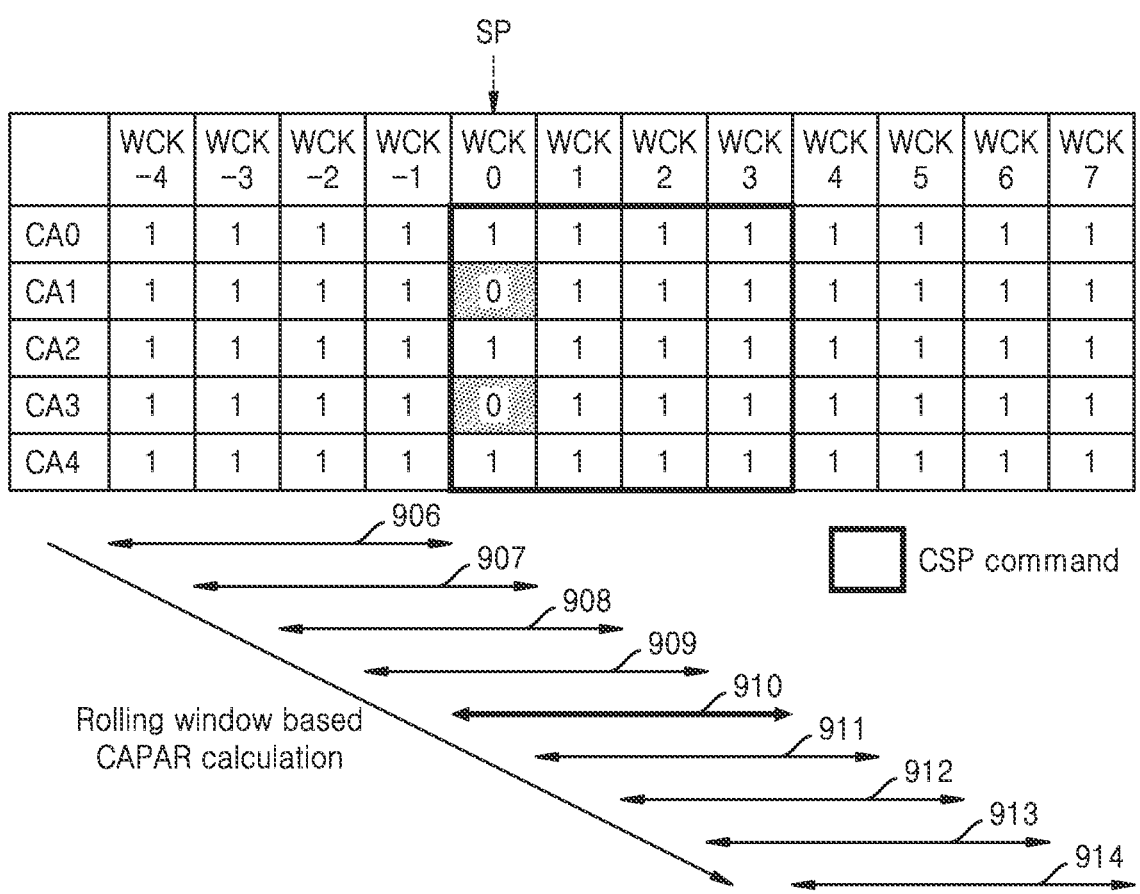
FIG. 9 is a diagram showing a rolling window-based CAPAR checking method according to example embodiments.

FIG. 9 is a diagram showing a rolling window-based CAPAR checking method according to example embodiments.

Referring to FIG. 9, the CAPAR checking method may be performed by using command windows 906 to 914 constituting a rolling window. For example, the CA[4:0] operands of the CSP command will be applied at any one of the command windows 906 to 914 of four cycles of a clock signal WCK. The command windows 906 to 914 may each be a rolling window delayed by one cycle of the clock signal WCK. The CAPAR checking method for a CSP command may be configured to find a command window in which the CA[4:0] operands of the CSP command are input, from among the command windows 906 to 914, and calculate whether the total number of logic 0 bit values of the CA[4:0] operands is an even value for each of the command windows 906 to 914.

The command window 906 may be set as a window that includes a WCK−4 rising edge, a WCK−3 rising edge, a WCK−2 rising edge, and a WCK−1 rising edge. CA[4:0] operands of the CSP command are not input in the command window 906, and the total number of logic 0 bit values in the command window 906 may be calculated as an even value. The command window 907 is set as a window that includes a WCK−3 rising edge, a WCK−2 rising edge, a WCK−1 rising edge, and a WCK0 rising edge, CA[4:0] operands of the CSP command are not input in the command window 907, and the total number of logic 0 bit values in the command window 907 is calculated as an even value. The command window 908 is set as a window that includes a WCK−2 rising edge, a WCK−1 rising edge, a WCK0 rising edge, and a WCK1 rising edge, CA[4:0] operands of the CSP command are not input in the command window 908, and the total number of logic 0 bit values in the command window 908 is calculated as an even value. The command window 909 is set as a window that includes a WCK−1 rising edge, a WCK0 rising edge, a WCK1 rising edge, and a WCK2 rising edge, CA[4:0] operands of the CSP command are not input in the command window 909, and the total number of logic 0 bit values in the command window 909 is calculated as an even value.

The command window 910 is set as a window that includes a WCK0 rising edge, a WCK1 rising edge, a WCK2 rising edge, and a WCK3 rising edge, CA[4:0] operands of the CSP command are input in the command window 910. The total number of logic 0 bit values in the command window 910 is calculated as an even value. In this regard, it may be determined that the CA[4:0] operands of the CSP command are valid in the command window 910. Therefore, the WCK0 rising edge will be recognized as the CSP SP of the CSP command, and CSPs SP of subsequent commands will be a WCK4 rising edge, a WCK8 rising edge, and a WCK12 rising edge.

The command window 911 is set as a window that includes a WCK1 rising edge, a WCK2 rising edge, a WCK3 rising edge, and a WCK4 rising edge, CA[4:0] operands of the CSP command are not input in the command window 911, and the total number of logic 0 bit values in the command window 911 is calculated as an even value. The command window 912 is set as a window that includes a WCK2 rising edge, a WCK3 rising edge, a WCK4 rising edge, and a WCK5 rising edge, CA[4:0] operands of the CSP command are not input in the command window 912, and the total number of logic 0 bit values in the command window 912 is calculated as an even value. The command window 913 is set as a window that includes a WCK3 rising edge, a WCK4 rising edge, a WCK5 rising edge, and a WCK6 rising edge, CA[4:0] operands of the CSP command are not input in the command window 913, and the total number of logic 0 bit values in the command window 913 is calculated as an even value. The command window 914 is set as a window that includes a WCK4 rising edge, a WCK5 rising edge, a WCK6 rising edge, and a WCK7 rising edge, CA[4:0] operands of the CSP command are not input in the command window 914, and the total number of logic 0 bit values in the command window 914 is calculated as an even value.

FIG. 10 is a diagram showing a method of finding a CSP command error by using the rolling window-based CAPAR checking method of FIG. 9.

In a manner similar to the CSP command error described in FIG. 8C, FIG. 10 shows a CSP command error in which CA1 operands of a CSP command are input at a WCK1 rising edge, a WCK2 rising edge, a WCK3 rising edge, and a WCK4 rising edge by being one WCK clock cycle delayed from the WCK0 rising edge, which is the CSP SP of the CSP command. From among command windows 906 to 912 constituting the rolling window described with reference to FIG. 9, the command window 907 is set to a window including a WCK−3 rising edge, a WCK−2 rising edge, a WCK−1 rising edge, and a WCK0 rising edge and the command window 911 is set as a window including a WCK1 rising edge, a WCK2 rising edge, a WCK3 rising edge, and a WCK4 rising edge.

In the command window 907, the total number of logic 0 bit values is calculated as an odd value. Therefore, it may be indicated that there is an error in the CA[4:0] operands of the CSP command in the command window 907. In the command window 911, the total number of logical 0 bit values is also calculated as an odd value, and thus, it may be indicated that there is an error in the CA[4:0] operands of the CSP command in the command window 911. A CA parity error of the command window 907 or the command window 911 may be transmitted to the memory controller 110 through a line for the error signal ERR (FIG. 1).

The memory controller 110 may determine that the CSP command is invalid based on the error signal ERR, re-perform CA bus training on the memory device 120, and issue a CSP command synchronized with the clock signal WCK to the memory device 120. The memory device 120 may receive a CSP command synchronized with the WCK0 rising edge from the memory controller 110, recognize that the CSP SP of a subsequent command will be the WCK4 rising edge, a WCK8 rising edge, and a WCK12 rising edge (i.e., at intervals of four rising edges of the clock signal WCK), and decode a command applied at the WCK4 rising edge, the WCK8 rising edge, and the WCK12 rising edge, thereby performing an operation according to the corresponding command.

Figure 11:
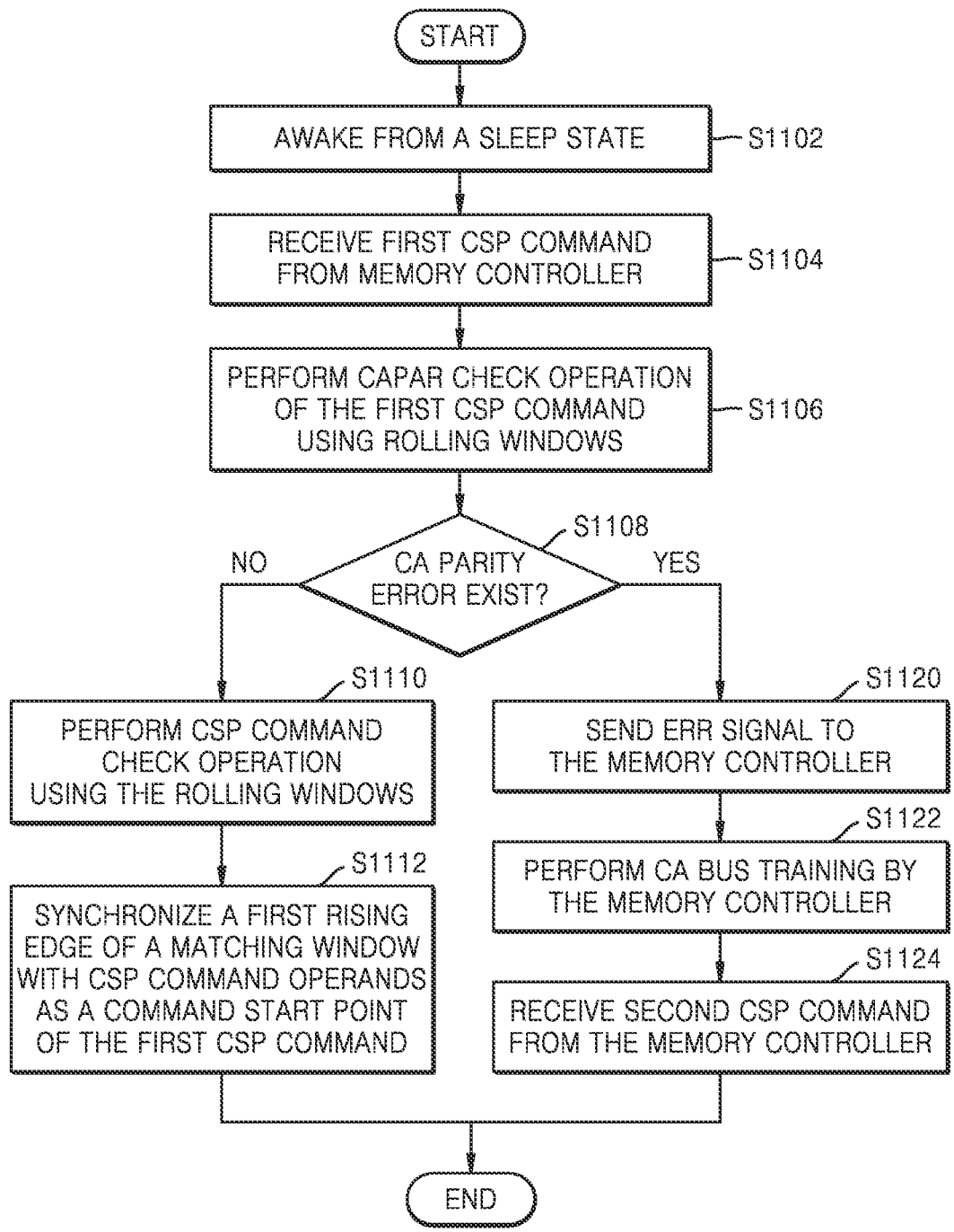
FIG. 11 is a diagram showing a method of operating a memory device, according to example embodiments.

FIG. 11 is a diagram showing a method of operating a memory device, according to example embodiments.

Referring to FIGS. 9 and 11, in operation S1102, the memory device 120 may wake up from a sleep state in response to the sleep exit command SLX of the memory controller 110.

In operation S1104, the memory device 120 may receive a first CSP command from the memory controller 110. As shown in FIG. 8A, the first CSP command may include idle CA[4:0] operands that logic 1 values are input as a CA0 input, a CA2 input, and a CA4 input and logic 0 values are input as a CA1 input and a CA3 input at the WCK0 rising edge and logic 1 values are input as CA[4:0] inputs at the WCK1 rising edge, the WCK2 rising edge, and the WCK3 rising edge. Alternatively, the first CSP command may include a CSP command error as described with reference to FIGS. 8B and 8C.

In operation S1106, the memory device 120 may perform a CAPAR checking operation with respect to the first CSP command by using rolling windows. As described with reference to FIG. 9, in the CAPAR checking operation, it may be determined whether the total number of logical 0 bit values from among CA[4:0] input values in the command windows 906 to 914 constituting rolling windows is calculated as an even value. According to another example embodiment, it may be checked whether the total number of logic 1 bit values from among CA[4:0] input values in the command windows 906 to 914 constituting the rolling windows is calculated as an even value.

In operation S1108, the memory device 120 may determine whether there is a CA parity error in the first CSP command as a CAPAR checking result. When an even value is calculated as the CAPAR checking result, it may be determined that there is no CA parity error in the first CSP command and the method may be proceed to operation S1110. In operations S1110 and S1112, operations for finding the CSP SP of the first CSP command will be performed. When an odd value is obtained as the CAPAR checking result in operation S1108, it may be determined that there is a CA parity error in the first CSP command, and the method may proceed to operation S1120.

In operation S1120, the memory device 120 may transmit an error signal ERR indicating that there is a CA parity error in the first CSP command to the memory controller 110. The memory controller 110 may determine that the first CSP command is invalid based on the error signal ERR and may determine that CA bus training is needed for the memory device 120.

In operation S1122, CA bus training may be performed for the memory device 120 by the memory controller 110 based on the error signal ERR. The memory controller 110 may transmit a CBT pattern to the memory device 120 through the CA bus 130, compare an output pattern of the memory device received through the DQ bus 130 with the CBT pattern, adjust the timing of a CA signal carrying the CBT pattern until the output pattern becomes identical to the CBT pattern, and determine whether the CA signal is accurately captured by the memory device. For example, the memory controller 110 may determine the CA signal is accurately captured by the memory device 120 when output pattern becomes identical to the CBT pattern. When the CA bus training is completed, the memory controller 110 may issue a second CSP command synchronized with the clock signal WCK to the memory device 120.

In operation S1124, the memory device 120 may receive a second CSP command from the memory controller 110. The memory device 120 may receive a second CSP command of which the CSP SP is aligned with the WCK0 rising edge from the memory controller 110, recognize that the CSP SP of a subsequent command will be a WCK4 rising edge, a WCK8 rising edge, and a WCK12 rising edge (i.e., at intervals of four rising edges of the clock signal WCK), and decode a command applied at the WCK4 rising edge, the WCK8 rising edge, and the WCK12 rising edge, thereby performing an operation according to the corresponding command.

When an even value is calculated as the CAPAR checking result of operation S1108, the method may proceed to operation S1110, and the memory device 120 may perform a CSP command checking operation for rolling windows. In the CSP command checking operation, as described with reference to FIG. 9, it may be checked whether CA[4:0] input values are identical to CSP command operands in the command windows 906 to 914 constituting the rolling windows and a command window in which the CA[4:0] input values are identical to the CSP command operands may be found.

In operation S1112, the memory device 120 may synchronize a first rising edge of the command window in which the CA[4:0] input values are identical to the CSP command operands to the CSP SP of the first CSP command. Therefore, a command boundary CB synchronized with the CSP SP of the first CSP command will be aligned with a corresponding WCK rising edge.

Figure 12:
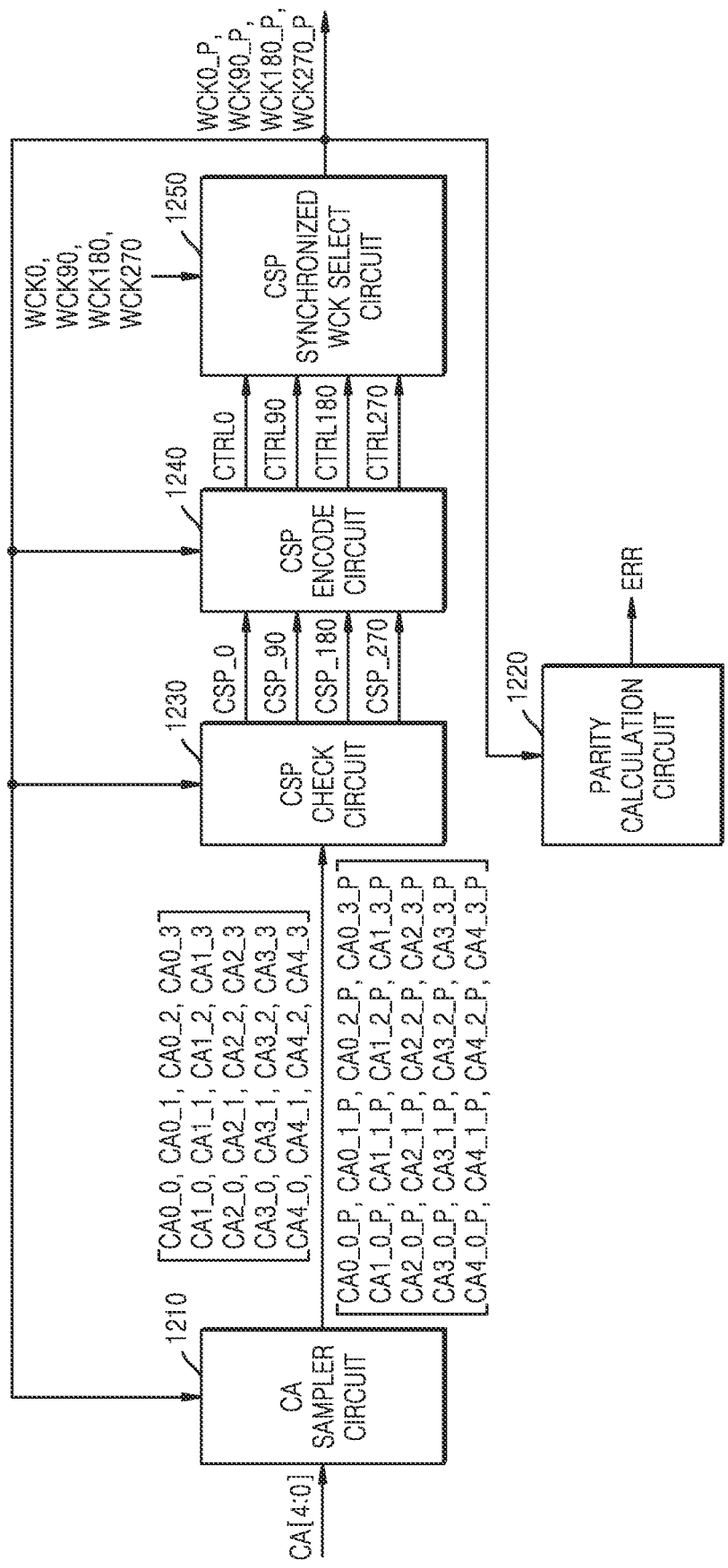
FIGS. 12 to 16 are block diagrams showing a command address (CA) parity circuit according to example embodiments.
Figure 13:
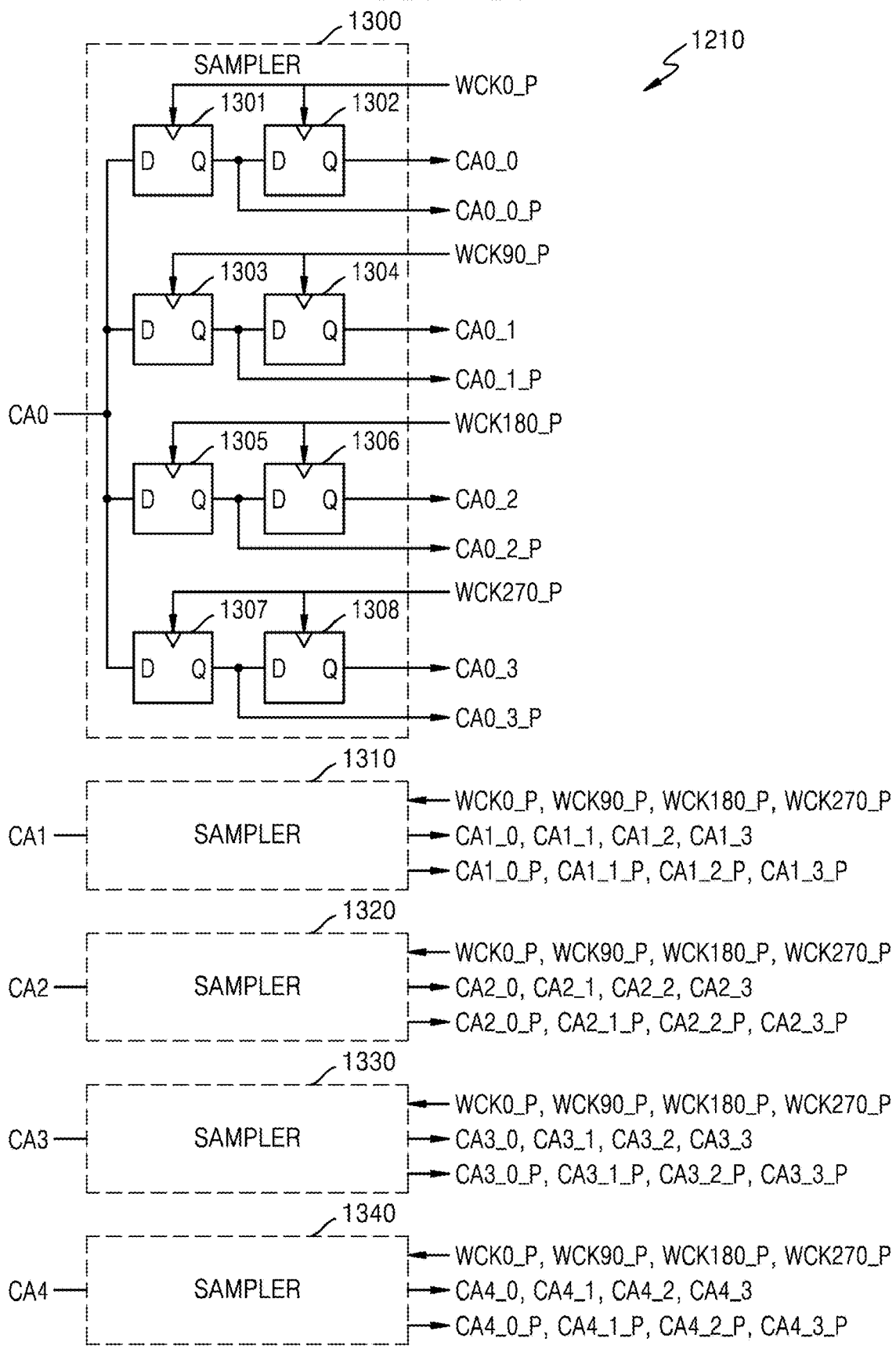
Figure 14:
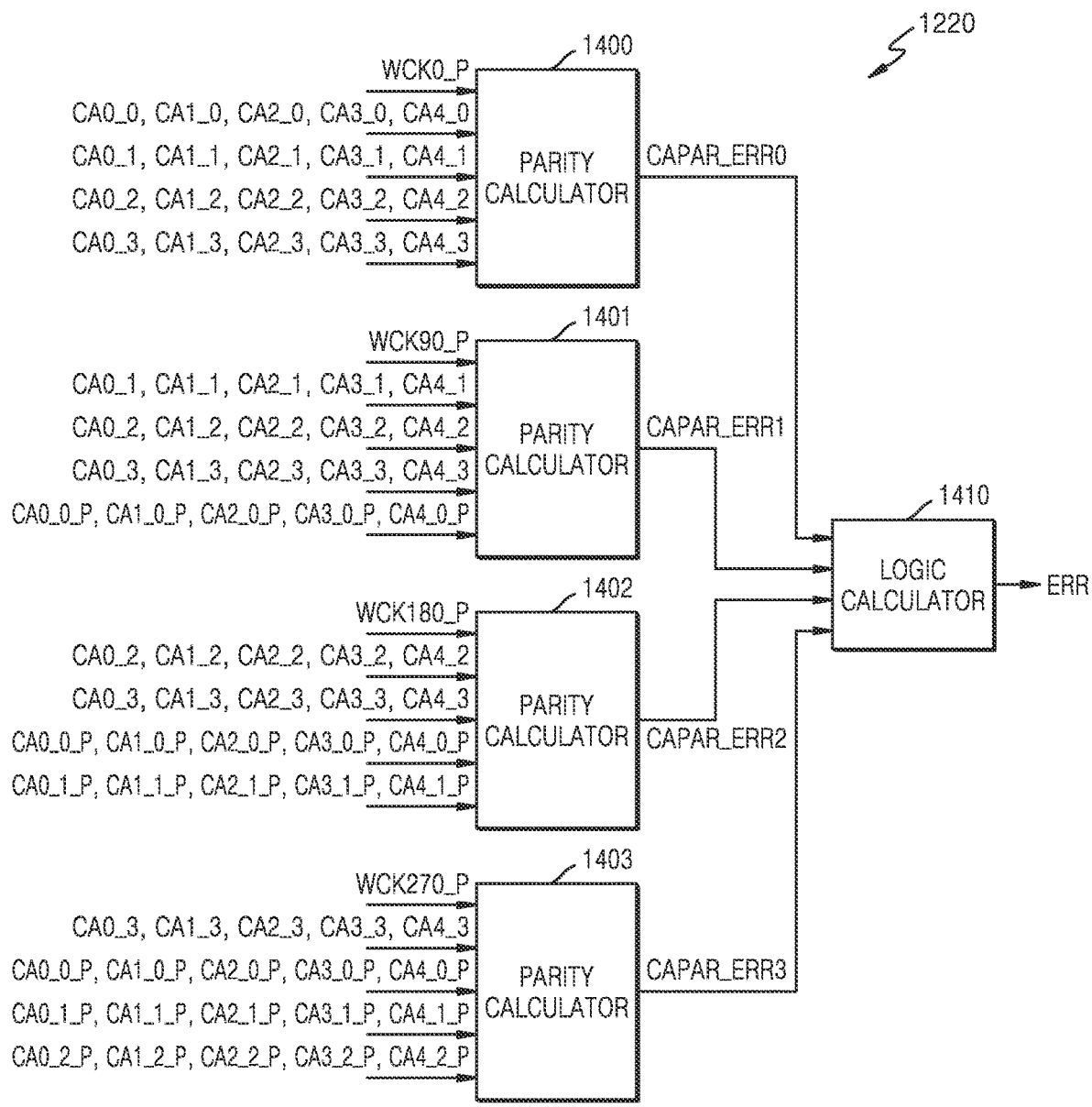
Figure 15:
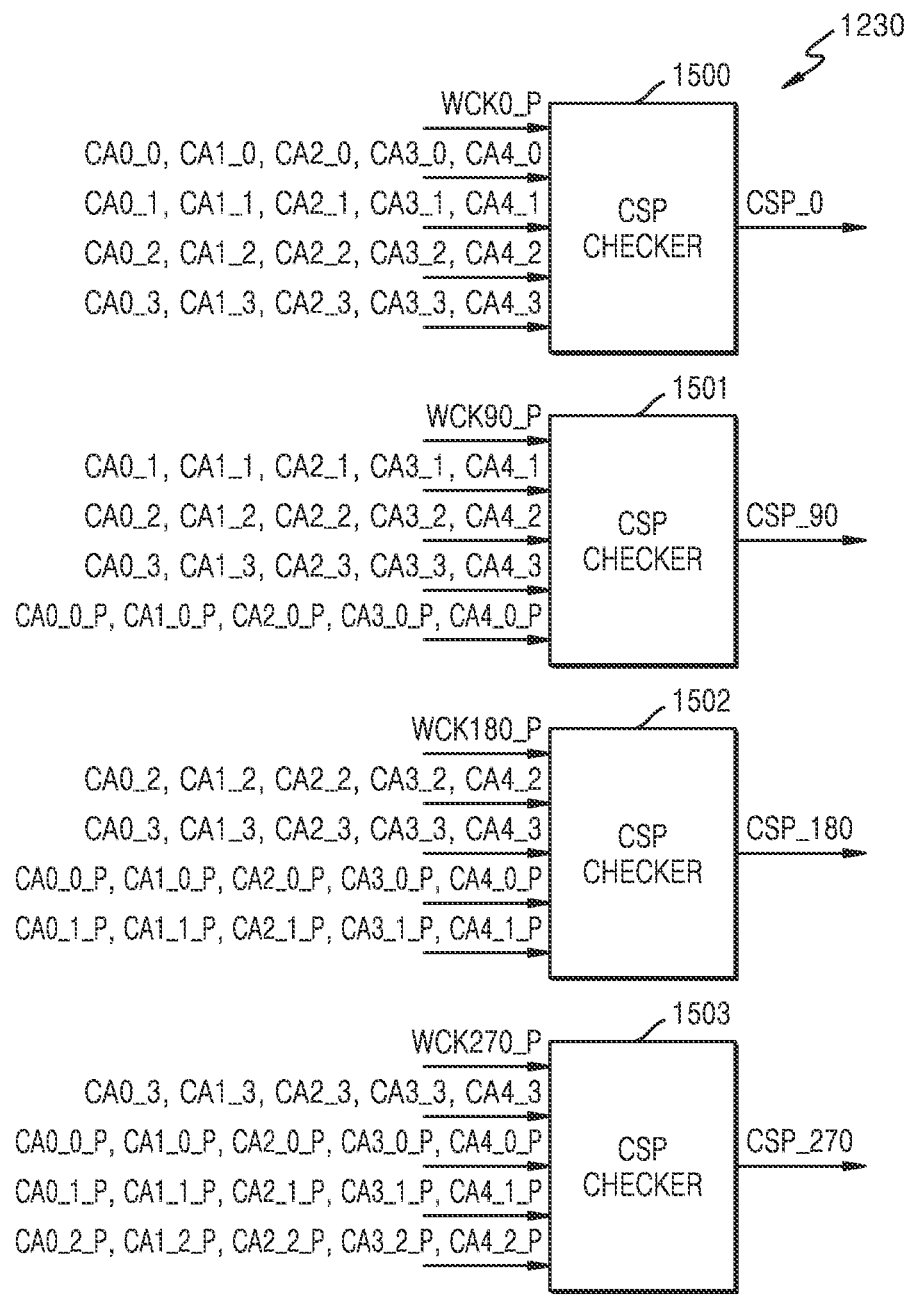
Figure 16:
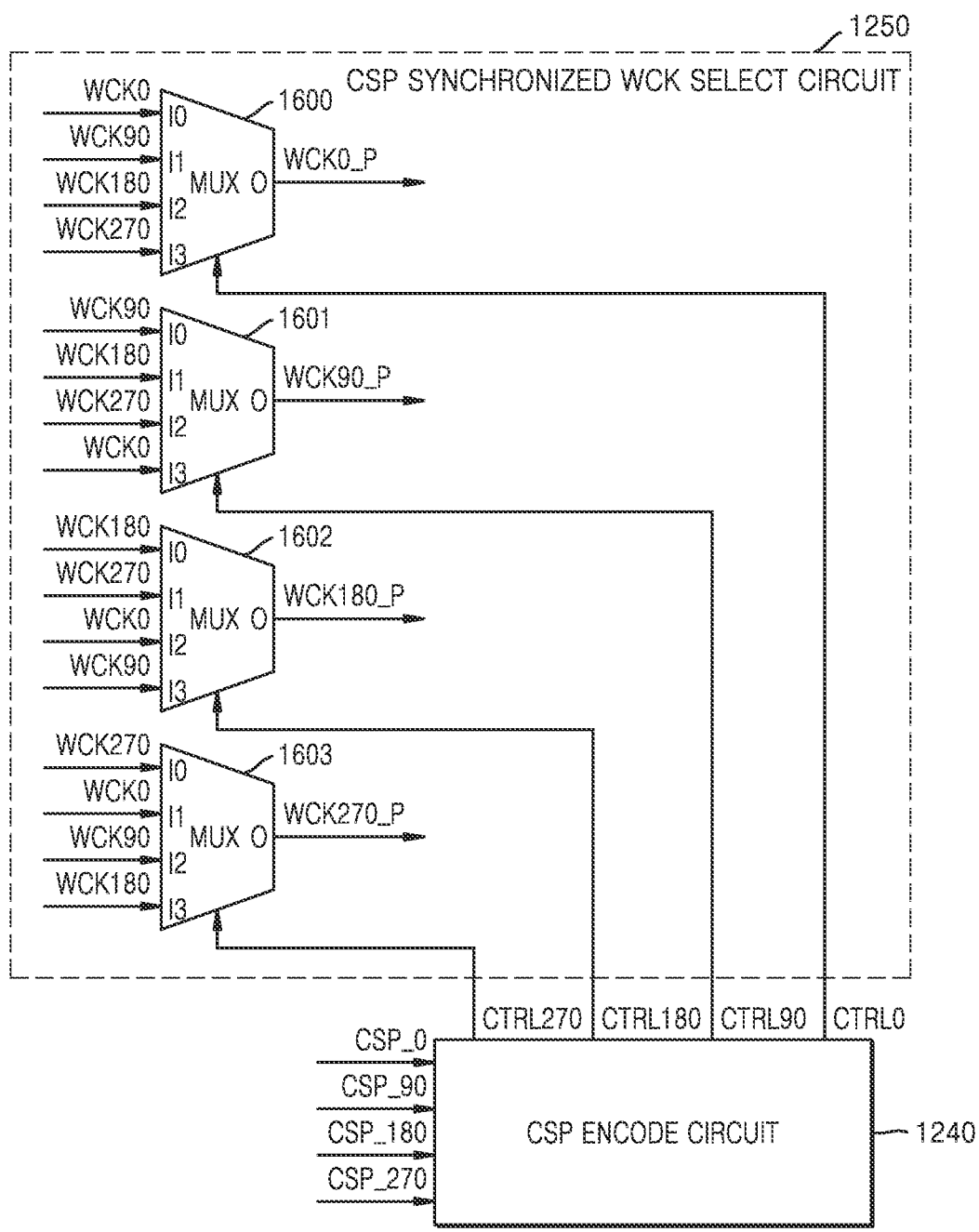

FIGS. 12 to 16 are block diagrams showing the CA parity circuit 124 according to example embodiments. FIG. 12 shows the CA parity circuit 124 of FIG. 2, FIG. 13 shows a CA sampler circuit 1210 of FIG. 12, FIG. 14 shows a parity calculating circuit 1220 of FIG. 12, and FIG. 15 shows a CSP check circuit 1230 of FIG. 12, and FIG. 16 shows a CSP encode circuit 1240 and a CSP-synchronized WCK selection circuit 1250 of FIG. 12.

Referring to FIG. 12, the CA parity circuit 124 may perform a CAPAR checking operation on a CA[4:0] signal to which command operands are applied. The CA parity circuit 124 may include the CA sampler circuit 1210, the parity calculating circuit 1220, the CSP check circuit 1230, the CSP encode circuit 1240, and the CSP-synchronized WCK selection circuit 1250.

The CA sampler circuit 1210 may latch the CA[4:0] signal in response to first to fourth phase clock signals WCK0_P, WCK90_P, WCK180_P, and WCK270_P selected by the CSP-synchronized WCK selection circuit 1250 and may latch the CA[4:0] signal in response to next first to fourth phase clock signals WCK0_P, WCK90_P, WCK180_P, and WCK270_P.

In response to the first to fourth phase clock signals WCK0_P, WCK90_P, WCK180_P, and WCK270_P, the CA sampler circuit 1210 latches may output a CA0_0 signal, a CA0_1 signal, a CA0_2 signal, and a CA0_3 signal by latching a CA0 signal, output a CA1_0 signal, a CA1_1 signal, a CA1_2 signal, and a CA1_3 signal by latching a CA1 signal, output a CA2_0 signal, a CA2_1 signal, a CA2_2 signal, and a CA2_3 signal by latching a CA2 signal, output a CA3_0 signal, a CA3_1 signal, a CA3_2 signal, and a CA3_3 signal by latching a CA3 signal, and output a CA4_0 signal, a CA4_1 signal, a CA4_2 signal, and a CA4_3 signal by latching a CA4 signal.

In response to the next first to fourth phase clock signals WCK0_P, WCK90_P, WCK180_P, and WCK270_P, the CA sampler circuit 1210 latches may output a CA0_0_P signal, a CA0_1_P signal, a CA0_2_P signal, and a CA0_3_P signal by latching a CA0 signal, output a CA1_0_P signal, a CA1_1_P signal, a CA1_2_P signal, and a CA1_3_P signal by latching a CA1 signal, output a CA2_0_P signal, a CA2_1_P signal, a CA2_2_P signal, and a CA2_3_P signal by latching a CA2 signal, output a CA3_0_P signal, a CA3_1_P signal, a CA3_2_P signal, and a CA3_3_P signal by latching a CA3 signal, and output a CA4_0_P signal, a CA4_1_P signal, a CA4_2_P signal, and a CA4_3_P signal by latching a CA4 signal.

The parity calculating circuit 1220 may perform a CARAR checking operation for each of command windows in which the first to fourth phase clock signals WCK0_P, WCK90_P, WCK180_P, and WCK270_P are set as CSPs SP of a CSP command, respectively. As a CARAR checking result, when a CA parity error occurs in any one command window, the parity calculating circuit 1220 may output an error signal ERR and transmit the error signal ERR to the memory controller 110.

The CSP check circuit 1230 may check whether each of command windows in which the first to fourth phase clock signals WCK0_P, WCK90_P, WCK180_P, and WCK270_P are respectively set as CSPs SP of a CSP command includes CA[4:0] operands of the CSP command. The CSP check circuit 1230 may output a first CSP check signal CSP_0 by checking CSP command operands with respect to a command window in which a first phase clock signal WCK0_P is set as the CSP SP. As a result of checking a CSP command, when the command window in which the first phase clock signal WCK0_P is set as the CSP SP includes CSP command operands, the CSP check circuit 1230 may output, for example, a logic high first CSP check signal CSP_0.

Similarly, when the command window in which a second phase clock signal WCK90_P is set as the CSP SP includes CSP command operands, the CSP check circuit 1230 may output a logic high second CSP check signal CSP_90, when the command window in which a third phase clock signal WCK180_P is set as the CSP SP includes CSP command operands, the CSP check circuit 1230 may output a logic high third CSP check signal CSP_180, and, when the command window in which a fourth phase clock signal WCK270_P is set as the CSP SP includes CSP command operands, the CSP check circuit 1230 may output a logic high fourth CSP check signal CSP_270.

The CSP encode circuit 1240 may receive first to fourth CSP check signals CSP_0, CSP_90, CSP_180, and CSP_270 and convert the first to fourth CSP check signals CSP_0, CSP_90, CSP_180, and CSP_270 into first to fourth control signals CTRL0, CTRL90, CTRL180, and CTRL270 for controlling to select a phase clock signal that becomes the CSP SP (i.e., a first rising edge) of a CSP command, select a phase clock signal that becomes a second rising edge of the CSP command, select a phase clock signal that becomes a third rising edge, and select a phase clock signal that becomes a fourth rising edge from among the first to fourth phase clock signals WCK0, WCK90, WCK180, and WCK270 generated by the clock circuit 122 of FIG. 4A.

The CSP-synchronized WCK selection circuit 1250 may receive the first to fourth phase clock signals WCK0, WCK90, WCK180, and WCK270 generated by the clock circuit 122 of FIG. 4A, select phase clock signals synchronized with first to fourth rising edges of the CSP command from among the first to fourth phase clock signals WCK0, WCK90, WCK180, and WCK270 in response to the first to fourth phase clock signals WCK0_P, WCK90_P, WCK180_P, and WCK270_P, and output selected phase clock signals as the first to fourth phase clock signals WCK0_P, WCK90_P, WCK180_P, and WCK270_P, respectively.

The first to fourth phase clock signals WCK0_P, WCK90_P, WCK180_P, and WCK270_P output from the CSP-synchronized WCK selection circuit 1250 may be provided to the CA sampler circuit 1210 to perform a CA[4:0] signal sampling operation and may be provided to the parity calculating circuit 1220 and the CSP check circuit 1230 to perform a CA parity calculation operation and a CSP checking operation for command windows constituting rolling windows.

Referring to FIG. 13, the CA sampler circuit 1210 may include first to fifth samplers 1300, 1310, 1320, 1330 and 1340 that sample a CA[4:0] signal in response to the first to fourth phase clock signals WCK0_P, WCK90_P, WCK180_P, and WCK270_P. The first to fourth phase clock signals WCK0_P, WCK90_P, WCK180_P, and WCK270_P may function identically to the first to fourth phase clock signals WCK0, WCK90, WCK180, and WCK270 described above with reference to FIGS. 4A and 4B, respectively. For example, "_P" of the first phase clock signal WCK0_P indicates "post", because, as shown in FIGS. 7A to 7D, modification of the CSP SP of a CSP command is finally determined by the CSP-synchronized WCK selection circuit 1250. Ultimately, the CA sampler circuit 1210 will perform a sampling operation in response to the first to fourth phase clock signals WCK0_P, WCK90_P, WCK180_P, and WCK270_P selected by the CSP-synchronized WCK selection circuit 1250.

A first sampler 1300 may include a D flip-flop 1301 latching a CA0 signal in response to the first phase clock signal WCK0_P, and a D flip-flop 1302 latching an output of the D flip-flop 1301. The output of the D flip-flop 1302 is indicated as a CA0_0 signal, and the output of the D flip-flop 1301 is indicated as a CA0_0_P signal with the meaning of being a next CA0_0 signal. In this regard, the CA0_O_P signal is the CA0 signal latched in response to a next first phase clock signal WCK0_P. For example, when the first phase clock signal WCK0_P corresponds to the WCK0 rising edge, the next first phase clock signal WCK0_P will correspond to the WCK4 rising edge.

The first sampler 1300 may include D flip-flops 1303 and 1304 and that latch the CA0 signal in response to the second phase clock signal WCK90_P. The D flip-flop 1304 may output a CA0_1 signal in response to the second phase clock signal WCK90_P, and the D flip-flop 1303 may output a CA0_1_P signal in response to a next second phase clock signal WCK90_P. For example, when the second phase clock signal WCK90_P corresponds to the WCK1 rising edge, the next second phase clock signal WCK90_P will correspond to the WCK5 rising edge.

The first sampler 1300 may include D flip-flops 1305 and 1306 that latch the CA0 signal in response to the third phase clock signal WCK180_P. The D flip-flop 1306 may output a CA0_2 signal in response to the third phase clock signal WCK180_P, and the D flip-flop 1305 may output a CA0_2_P signal in response to a next third phase clock signal WCK180_P. For example, when the third phase clock signal WCK180_P corresponds to the WCK2 rising edge, the next third phase clock signal WCK180_P will correspond to the WCK6 rising edge.

The first sampler 1300 may include D flip-flops 1307 and 1308 that latch the CA0 signal in response to the fourth phase clock signal WCK270_P. The D flip-flop 1308 may output a CA0_3 signal in response to the fourth phase clock signal WCK270_P, and the D flip-flop 1307 may output a CA0_3_P signal in response to a next fourth phase clock signal WCK270_P. For example, when the fourth phase clock signal WCK270_P corresponds to the WCK3 rising edge, the next fourth phase clock signal WCK270_P will correspond to the WCK7 rising edge.

Similarly, a second sampler 1310 may output a CA1_0 signal, a CA1_1 signal, a CA1_2 signal, and a CA1_3 signal by latching the CA1 signal in response to the first to fourth phase clock signals WCK0_P, WCK90_P, WCK180_P, and WCK270_P, respectively, and output a CA1_0_P signal, a CA1_1_P signal, a CA1_2_P signal, and a CA1_3_P signal by latching the CA1 signal in response to next first to fourth phase clock signals WCK0_P, WCK90_P, WCK180_P, and WCK270_P, respectively.

A third sampler 1320 may output a CA2_0 signal, a CA2_1 signal, a CA2_2 signal, and a CA2_3 signal by latching the CA2 signal in response to the first to fourth phase clock signals WCK0_P, WCK90_P, WCK180_P, and WCK270_P, respectively, and output a CA2_0_P signal, a CA2_1_P signal, a CA2_2_P signal, and a CA2_3_P signal by latching the CA2 signal in response to next first to fourth phase clock signals WCK0_P, WCK90_P, WCK180_P, and WCK270_P, respectively.

A fourth sampler 1330 may output a CA3_0 signal, a CA3_1 signal, a CA3_2 signal, and a CA3_3 signal by latching the CA3 signal in response to the first to fourth phase clock signals WCK0_P, WCK90_P, WCK180_P, and WCK270_P, respectively, and output a CA3_0_P signal, a CA3_1_P signal, a CA3_2_P signal, and a CA3_3_P signal by latching the CA3 signal in response to next first to fourth phase clock signals WCK0_P, WCK90_P, WCK180_P, and WCK270_P, respectively.

A fifth sampler 1340 may output a CA4_0 signal, a CA4_1 signal, a CA4_2 signal, and a CA4_3 signal by latching the CA4 signal in response to the first to fourth phase clock signals WCK0_P, WCK90_P, WCK180_P, and WCK270_P, respectively, and output a CA4_0_P signal, a CA4_1_P signal, a CA4_2_P signal, and a CA4_3_P signal by latching the CA4 signal in response to next first to fourth phase clock signals WCK0_P, WCK90_P, WCK180_P, and WCK270_P, respectively.

Referring to FIG. 14, the parity calculating circuit 1220 may include first to fourth parity calculators (i.e., parity calculation circuits) 1400 to 1403 that perform CAPAR checking operation for command windows in which the first to fourth phase clock signals WCK0_P, WCK90_P, WCK180_P, and WCK270_P are set as the CSP SP of a CSP command, respectively, and a logic calculator (i.e., logic circuit) 1410.

A first parity calculator 1400 may set the first phase clock signal WCK0_P (or the WCK0 rising edge) as the CSP SP, calculate whether the total number of logic 0 bit values from among bit values of the CA0_0 signal, the CA1_0 signal, the CA2_0 signal, the CA3_0 signal, and the CA4_0 signal latched by the first phase clock signal WCK0_P (or the WCK0 rising edge), the CA0_1 signal, the CA1_1 signal, the CA2_1 signal, the CA3_1 signal, and the CA4_1 signal latched by the second phase clock signal WCK90_P (or the WCK1 rising edge), the CA0_2 signal, the CA1_2 signal, the CA2_2 signal, the CA3_2 signal, and the CA4_2 signal latched by the third phase clock signal WCK180_P (or the WCK2 rising edge), and the CA0_3 signal, the CA1_3 signal, the CA2_3 signal, the CA3_3 signal, and the CA4_3 signal latched by the fourth phase clock signal WCK270_P (or the WCK3 rising edge) is an even value, and output a first CAPAR check signal CAPAR_ERR0. When a CAPAR checking result is not an even value, the first parity calculator 1400 may output, for example, a logic low first CAPAR check signal CAPAR_ERR0. The first parity calculator 1400 may output the first CAPAR check signal CAPAR_ERR0 by performing a CAPAR checking operation for the command window 906, 910, or 914 shown in FIG. 9. The logic low first CAPAR check signal CAPAR_ERR0 indicates that there is a CA parity error in the command window 906, 910, or 914.

A second parity calculator 1401 may set the second phase clock signal WCK90_P (or the WCK1 rising edge) as the CSP SP, calculate whether the total number of logic 0 bit values from among bit values of the CA0_1 signal, the CA1_1 signal, the CA2_1 signal, the CA3_1 signal, and the CA4_1 signal latched by the second phase clock signal WCK90_P (or the WCK1 rising edge), the CA0_2 signal, the CA1_2 signal, the CA2_2 signal, the CA3_2 signal, and the CA4_2 signal latched by the third phase clock signal WCK180_P (or the WCK2 rising edge), the CA0_3 signal, the CA1_3 signal, the CA2_3 signal, the CA3_3 signal, and the CA4_3 signal latched by the fourth phase clock signal WCK270_P (or the WCK3 rising edge), and the CA0_0_P signal, the CA1_0_P signal, the CA2_0_P signal, the CA3_0_P signal, and the CA4_0_P signal latched by a next first phase clock signal WCK0_P (or the WCK4 rising edge) is an even value, and output a second CAPAR check signal CAPAR_ERR1. When a CAPAR checking result is an even value, the second parity calculator 1401 may output, for example, a logic low second CAPAR check signal CAPAR_ERR1. The second parity calculator 1401 may output the second CAPAR check signal CAPAR_ERR1 by performing a CAPAR checking operation for the command window 907 or 911 shown in FIG. 9. The logic low second CAPAR check signal CAPAR_ERR1 indicates that there is a CA parity error in the command window 907 or 911.

A third parity calculator 1402 may set the third phase clock signal WCK180_P (or the WCK2 rising edge) as the CSP SP, calculate whether the total number of logic 0 bit values from among bit values of the CA0_2 signal, the CA1_2 signal, the CA2_2 signal, the CA3_2 signal, and the CA4_2 signal latched by the third phase clock signal WCK180_P (or the WCK2 rising edge), the CA0_3 signal, the CA1_3 signal, the CA2_3 signal, the CA3_3 signal, and the CA4_3 signal latched by the fourth phase clock signal WCK270_P (or the WCK3 rising edge), the CA0_0_P signal, the CA1_0_P signal, the CA2_0_P signal, the CA3_0_P signal, and the CA4_0_P signal latched by the next first phase clock signal WCK0_P (or the WCK4 rising edge), and the CA0_1_P signal, the CA1_1_P signal, the CA2_1_P signal, the CA3_1_P signal, and the CA4_1_P signal latched by a next second phase clock signal WCK90_P (or the WCK5 rising edge) is an even value, and output a third CAPAR check signal CAPAR_ERR2. When a CAPAR checking result is an even value, the third parity calculator 1402 may output, for example, a logic low third CAPAR check signal CAPAR_ERR2. The third parity calculator 1402 may output the third CAPAR check signal CAPAR_ERR2 by performing a CAPAR checking operation for the command window 908 or 912 shown in FIG. 9. The logic low third CAPAR check signal CAPAR_ERR2 indicates that there is a CA parity error in the command window 908 or 912.

A fourth parity calculator 1403 may set the fourth phase clock signal WCK270_P (or the WCK3 rising edge) as the CSP SP, calculate whether the total number of logic 0 bit values from among bit values of the CA0_3 signal, the CA1_3 signal, the CA2_3 signal, the CA3_3 signal, and the CA4_3 signal latched by the fourth phase clock signal WCK270_P (or the WCK3 rising edge), the CA0_0_P signal, the CA1_0_P signal, the CA2_0_P signal, the CA3_0_P signal, and the CA4_0_P signal latched by the next first phase clock signal WCK0_P (or the WCK4 rising edge), the CA0_1_P signal, the CA1_1_P signal, the CA2_1_P signal, the CA3_1_P signal, and the CA4_1_P signal latched by the next second phase clock signal WCK90_P (or the WCK5 rising edge), and the CA0_2_P signal, the CA1_2_P signal, the CA2_2_P signal, the CA3_2_P signal, and the CA4_2_P signal latched by a next third phase clock signal WCK180_P (or the WCK6 rising edge) is an even value, and output a fourth CAPAR check signal CAPAR_ERR3. When a CAPAR checking result is an even value, the fourth parity calculator 1403 may output, for example, a logic low fourth CAPAR check signal CAPAR_ERR3. The fourth parity calculator 1403 may output the fourth CAPAR check signal CAPAR_ERR3 by performing a CAPAR checking operation for the command window 909 or 913 shown in FIG. 9. The logic low fourth CAPAR check signal CAPAR_ERR3 indicates that there is a CA parity error in the command window 909 or 913.

Figure 17:
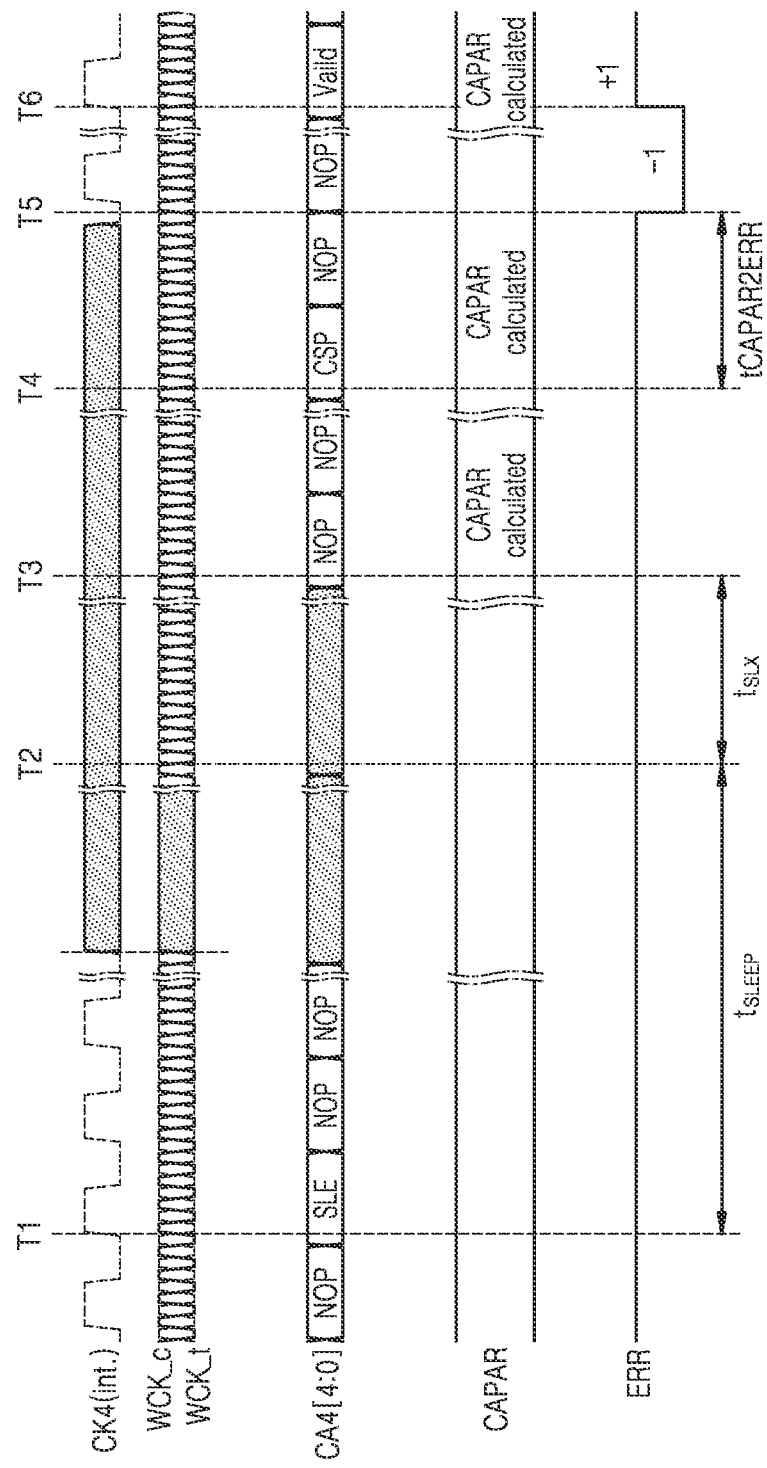
FIG. 17 is a timing diagram associated with an operation of a memory device according to example embodiments.

The logic calculator 1410 may receive inputs of first to fourth CAPAR check signals CARAR_ERR0 to CAPAR_ERR3 and output an error signal ERR. When any one of the first to fourth CAPAR check signals CARAR_ERR0 to CAPAR_ERR3 is logic low (i.e., when any one has a CA parity error), the logic calculator 1410 may output the error signal ERR as a level −1 PAM3 signal (FIG. 17). When there is no CA parity error in the first to fourth CAPAR check signals CARAR_ERR0 to CAPAR_ERR3, the logic calculator 1410 may output the error signal ERR as a level +1 PAM3 signal. A PAM-3 signal may be used to convert the error signal ERR into a single multi-level signal having three levels. A PAM-3 mode may have three voltage levels indicated as levels −1, 0, or +1. As an example, for a VDDQ supply voltage level, a level −1 may be set to have a 0.5×VDDQ level, a level 0 may be set to have a 0.75× VDDQ level, and a level 1 may be set to have a 1×VDDQ level. Here, PAM-3 signal is described only as an example, and the embodiments of the disclosure are not limited thereto. For example, PAM-n signal may be used, where n is a natural number greater than or equal to 2.

Referring to FIG. 15, the CSP check circuit 1230 may include CSP checkers 1500 to 1503 that check CA[4:0] operands of a CSP command for command windows in which the first to fourth phase clock signals WCK0_P, WCK90_P, WCK180_P, and WCK270_P are set as CSPs SP of the CSP command, respectively.

The first CSP checker 1500 may set the first phase clock signal WCK0_P (or the WCK0 rising edge) as the CSP SP, check whether a command code consisting of the CA0_0 signal, the CA1_0 signal, the CA2_0 signal, the CA3_0 signal, and the CA4_0 signal latched by the first phase clock signal WCK0_P (or the WCK0 rising edge), the CA0_1 signal, the CA1_1 signal, the CA2_1 signal, the CA3_1 signal, and the CA4_1 signal latched by the second phase clock signal WCK90_P (or the WCK1 rising edge), the CA0_2 signal, the CA1_2 signal, the CA2_2 signal, the CA3_2 signal, and the CA4_2 signal latched by the third phase clock signal WCK180_P (or the WCK2 rising edge), and the CA0_3 signal, the CA1_3 signal, the CA2_3 signal, the CA3_3 signal, and the CA4_3 signal latched by the fourth phase clock signal WCK270_P (or the WCK3 rising edge) corresponds to CA[4:0] operands of a CSP command, and output the first CSP check signal CSP_0. When the command code corresponds the CA[4:0] operands of the CSP command, the first CSP checker 1500 may output, for example, a logic high first CSP check signal CSP_0.

The second CSP checker 1501 may set the second phase clock signal WCK90_P (or the WCK1 rising edge) as the CSP SP, check whether a command code consisting of the CA0_1 signal, the CA1_1 signal, the CA2_1 signal, the CA3_1 signal, and the CA4_1 signal latched by the second phase clock signal WCK90_P (or the WCK1 rising edge), the CA0_2 signal, the CA1_2 signal, the CA2_2 signal, the CA3_2 signal, and the CA4_2 signal latched by the third phase clock signal WCK180_P (or the WCK2 rising edge), the CA0_3 signal, the CA1_3 signal, the CA2_3 signal, the CA3_3 signal, and the CA4_3 signal latched by the fourth phase clock signal WCK270_P (or the WCK3 rising edge), and the CA0_O_P signal, the CA1_0_P signal, the CA2_0_P signal, the CA3_0_P signal, and the CA4_0_P signal latched by a next first phase clock signal WCK0_P (or the WCK4 rising edge) corresponds to CA[4:0] operands of the CSP command, and output the second CSP check signal CSP_90. When the command code corresponds the CA[4:0] operands of the CSP command, the second CSP checker 1501 may output, for example, a logic high second CSP check signal CSP_90.

The third CSP checker 1502 may set the third phase clock signal WCK180_P (or the WCK2 rising edge) as the CSP SP, check whether a command code consisting of the CA0_2 signal, the CA1_2 signal, the CA2_2 signal, the CA3_2 signal, and the CA4_2 signal latched by the third phase clock signal WCK180_P (or the WCK2 rising edge), the CA0_3 signal, the CA1_3 signal, the CA2_3 signal, the CA3_3 signal, and the CA4_3 signal latched by the fourth phase clock signal WCK270_P (or the WCK3 rising edge), the CA0_O_P signal, the CA1_0_P signal, the CA2_0_P signal, the CA3_0_P signal, and the CA4_0_P signal latched by the next first phase clock signal WCK0_P (or the WCK4 rising edge), and the CA0_1_P signal, the CA1_1_P signal, the CA2_1_P signal, the CA3_1_P signal, and the CA4_1_P signal latched by a next second phase clock signal WCK90_P (or the WCK5 rising edge) corresponds to CA[4:0] operands of the CSP command, and output the third CSP check signal CSP_180. When the command code corresponds the CA[4:0] operands of the CSP command, the third CSP checker 1502 may output, for example, a logic high third CSP check signal CSP_180.

The fourth CSP checker 1503 may set the fourth phase clock signal WCK270_P (or the WCK3 rising edge) as the CSP SP, check whether a command code consisting of the CA0_3 signal, the CA1_3 signal, the CA2_3 signal, the CA3_3 signal, and the CA4_3 signal latched by the fourth phase clock signal WCK270_P (or the WCK3 rising edge), the CA0_0_P signal, the CA1_0_P signal, the CA2_0_P signal, the CA3_0_P signal, and the CA4_0_P signal latched by the next first phase clock signal WCK0_P (or the WCK4 rising edge), the CA0_1_P signal, the CA1_1_P signal, the CA2_1_P signal, the CA3_1_P signal, and the CA4_1_P signal latched by the next second phase clock signal WCK90_P (or the WCK5 rising edge), and the CA0_2_P signal, the CA1_2_P signal, the CA2_2_P signal, the CA3_2_P signal, and the CA4_2_P signal latched by a next third phase clock signal WCK180_P (or the WCK6 rising edge) corresponds to CA[4:0] operands of the CSP command, and output the fourth CSP check signal CSP_270. When the command code corresponds the CA[4:0] operands of the CSP command, the fourth CSP checker 1503 may output, for example, a logic high fourth CSP check signal CSP_270.

Referring to FIG. 16, the CSP encode circuit 1240 may generate, based on the first to fourth CSP check signals CSP_0, CSP_90, CSP_180, and CSP_270, first to fourth control signals CTRL0, CTRL90, CTRL180, and CTRL270 for controlling to select a phase clock signal that becomes the CSP SP (i.e., a first rising edge) of a CSP command, select a phase clock signal that becomes a second rising edge of the CSP command, select a phase clock signal that becomes a third rising edge, and select a phase clock signal that becomes a fourth rising edge from among the first to fourth phase clock signals WCK0, WCK90, WCK180, and WCK270 generated by the clock circuit 122 of FIG. 4A. The first to fourth control signals CTRL0, CTRL90, CTRL180, and CTRL270 may be provided to the CSP-synchronized WCK selection circuit 1250.

The CSP-synchronized WCK selection circuit 1250 may include first to fourth MUXs 1600 to 1603 that input the first to fourth phase clock signals WCK0, WCK90, WCK180, and WCK270 generated by the clock circuit 122 of FIG. 4A as first to fourth input signals 10 to 13, respectively, and output the first to fourth phase clock signals WCK0_P, WCK90_P, WCK180_P, and WCK270_P as output signals O. The first to fourth MUXs 1600 to 1603 may, in response to the first to fourth control signals CTRL0, CTRL90, CTRL180, and CTRL270, select phase clock signals input as the first to fourth input signals 10 to 13 and output selected phase signals as the first to fourth phase clock signals WCK0_P, WCK90_P, WCK180_P, and WCK270_P, respectively.

Based on the first to fourth control signals CTRL0, CTRL90, CTRL180, and CTRL270 that function predominantly on the logic high first CSP check signal CSP_0, the first to fourth MUXs 1600 to 1603 may select phase clock signals input as first input signals 10 and output the phase clock signals as the first to fourth phase clock signals WCK0_P, WCK90_P, WCK180_P, and WCK270_P, respectively. In this regard, the first to fourth phase clock signals WCK0, WCK90, WCK180, and WCK270 generated by the clock circuit 122 may be output as corresponding first to fourth phase clock signals WCK0_P, WCK90_P, WCK180_P, and WCK270_P, respectively. Therefore, as shown in FIG. 7A, the CSP SP of the CSP command may be found as the WCK0 rising edge and aligned with the command boundary 700.

Based on the first to fourth control signals CTRL0, CTRL90, CTRL180, and CTRL270 that function predominantly on the logic high second CSP check signal CSP_90, the first to fourth MUXs 1600 to 1603 may select phase clock signals input as second input signals I1 and output the phase clock signals as the first to fourth phase clock signals WCK0_P, WCK90_P, WCK180_P, and WCK270_P, respectively. In this regard, phase clock signals WCK90, WCK180, WCK270, and WCK0 generated by the clock circuit 122 may be output as corresponding first to fourth phase clock signals WCK0_P, WCK90_P, WCK180_P, and WCK270_P, respectively. Therefore, as shown in FIG. 7B, the CSP SP of the CSP command may be found as the WCK1 rising edge and aligned with the command boundary 701.

Based on the first to fourth control signals CTRL0, CTRL90, CTRL180, and CTRL270 that function predominantly on the logic high third CSP check signal CSP_180, the first to fourth MUXs 1600 to 1603 may select phase clock signals input as third input signals 12 and output the phase clock signals as the first to fourth phase clock signals WCK0_P, WCK90_P, WCK180_P, and WCK270_P, respectively. In this regard, phase clock signals WCK180, WCK270, WCK0, and WCK90 generated by the clock circuit 122 may be output as corresponding first to fourth phase clock signals WCK0_P, WCK90_P, WCK180_P, and WCK270_P, respectively. Therefore, as shown in FIG. 7C, the CSP SP of the CSP command may be found as the WCK2 rising edge and aligned with the command boundary 702.

Based on the first to fourth control signals CTRL0, CTRL90, CTRL180, and CTRL270 that function predominantly on the logic high fourth CSP check signal CSP_270, the first to fourth MUXs 1600 to 1603 may select phase clock signals input as fourth input signals 13 and output the phase clock signals as the first to fourth phase clock signals WCK0_P, WCK90_P, WCK180_P, and WCK270_P, respectively. In this regard, phase clock signals WCK270, WCK0, WCK90, and WCK180 generated by the clock circuit 122 may be output as corresponding first to fourth phase clock signals WCK0_P, WCK90_P, WCK180_P, and WCK270_P, respectively. Therefore, as shown in FIG. 7D, the CSP SP of the CSP command may be found as the WCK3 rising edge and aligned with the command boundary 703.

The first to fourth phase clock signals WCK0_P, WCK90_P, WCK180_P, and WCK270_P output from the CSP-synchronized WCK selection circuit 1250 may be provided to the CA sampler circuit 1210 to perform a CA[4:0] signal sampling operation and may be provided to the parity calculating circuit 1220 and the CSP check circuit 1230 to perform a CA parity calculation operation and a CSP checking operation for command windows constituting rolling windows.

FIG. 17 is a timing diagram associated with an operation of a memory device according to example embodiments. Referring to FIG. 17, an operation in which the memory device 120 described with reference to FIGS. 1 to 16 informs an error in a CSP command to the memory controller 110 will be described.

Referring to FIG. 17, a sleep entry command SLE is applied to a CA[4:0] signal line at a time point T1, the memory device 120 is in a sleep state for a time $t_{SLEEP}$, and the clock signal WCK may be deactivated in the sleep state. The clock signal WCK may be activated during a time $t_{SLX}$ between a time point T2 and a time point T3 in which the memory device 120 wakes up from the sleep state.

At a time point T4, CSP command operands may be applied to the CA[4:0] signal line. The memory device 120 may check whether the total number of logic 0 bit values from among CA[4:0] input values in the command windows 906 to 914 constituting the rolling windows during a time tCARPAR2ERR between the time point T4 and a time point T5 is an even value.

When a CAPAR checking result is an odd value, the memory device 120 may output an error signal ERR indicating that there is a CA parity error in the CSP command as a level −1 PAM3 signal during four WCK clock cycles from the time point T5 to a time point T6 and transmit the error signal ERR to the memory controller 110. Thereafter, the memory controller 110 will perform CA bus training on the memory device 120 in response to the error signal ERR.

FIG. 18 is a diagram showing an error pattern according to example embodiments.

Referring to FIG. 18, an error pattern may be provided as a CA[4:0] input. At a WCKn rising edge, a WCKn+1 rising edge, a WCKn+2 rising edge, and a WCKn+3 rising edge of an error boundary EB of the error pattern, logic 1 values may be input as CA0, CA1, CA2, and CA4 inputs, logic 0 values may be input as CA3 inputs at the WCKn rising edge, the WCKn+1 rising edge, and the WCKn+2 rising edge, and a logic 1 value may be input at the WCKn+3 rising edge. CA[4:0] operands of the error pattern may correspond to an error pattern intended by the memory controller 110 to be calculated as an odd value in a CA parity checking operation for the error boundary EB, i.e., detection of a CA parity error is intended.

Figure 19:
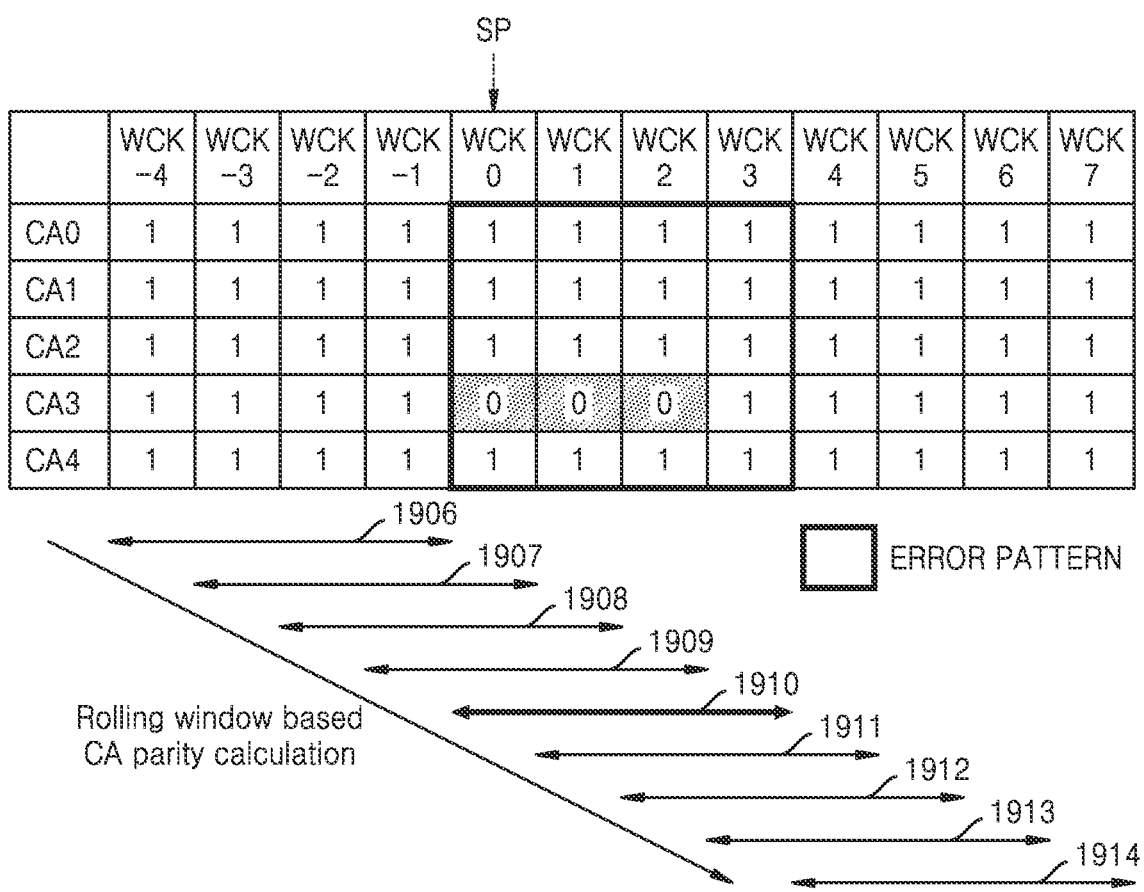
FIG. 19 is a diagram showing a rolling window-based CAPAR checking method for the error pattern of FIG. 18.

FIG. 19 is a diagram showing a rolling window-based CAPAR checking method for the error pattern of FIG. 18.

Referring to FIG. 19, the CAPAR checking method may be performed by using command windows 1906 to 1914 constituting a rolling window. For example, the CA[4:0] operands of an error pattern will be applied at any one of the windows 1906 to 1914 of four cycles of a clock signal WCK. The windows 1906 to 1914 may each be a rolling window delayed by one cycle of the clock signal WCK. A CAPAR checking method for an error pattern may be configured to find a window in which the CA[4:0] operands of the error pattern are input from among the windows 1906 to 1914 and calculate whether the total number of logic 0 bit values of the CA[4:0] operands is an even value for each of the windows 1906 to 1914.

A window 1906 may be set as a window that includes a WCK−4 rising edge, a WCK−3 rising edge, a WCK−2 rising edge, and a WCK−1 rising edge. A window 1907 may be set as a window that includes a WCK−3 rising edge, a WCK−2 rising edge, a WCK−1 rising edge, and a WCK0 rising edge, a window 1908 may be set as a window that includes a WCK−2 rising edge, a WCK−1 rising edge, a WCK0 rising edge, and a WCK1 rising edge, and 1 window 1909 may be set as a window that includes a WCK−1 rising edge, a WCK0 rising edge, a WCK1 rising edge, and a WCK2 rising edge. A window 1910 may be set as a window that includes a WCK0 rising edge, a WCK1 rising edge, a WCK2 rising edge, and a WCK3 rising edge, a window 1911 may be set as a window that includes a WCK1 rising edge, a WCK2 rising edge, a WCK3 rising edge, and a WCK4 rising edge, a window 1912 may be set as a window that includes a WCK2 rising edge, a WCK3 rising edge, a WCK4 rising edge, and a WCK5 rising edge, a window 1913 may be set as a window that includes a WCK3 rising edge, a WCK4 rising edge, a WCK5 rising edge, and a WCK6 rising edge, and a window 1914 may be set as a window that includes a WCK4 rising edge, a WCK5 rising edge, a WCK6 rising edge, and a WCK7 rising edge.

In the window 1910, CA[4:0] operands of the error pattern are input. The total number of logic 0 bit values in the window 1910 is calculated as an odd value. In this regard, CA[4:0] operands in the window 1910 correspond to an error pattern intended to cause a CA parity error. The memory device 120 may detect a CA parity error with respect to the error pattern and transmit an error signal ERR to the memory controller 110. The memory controller 110 may receive the error signal ERR, determine that the error pattern is valid, and issue a CSP command to the memory device 120.

Figure 20:
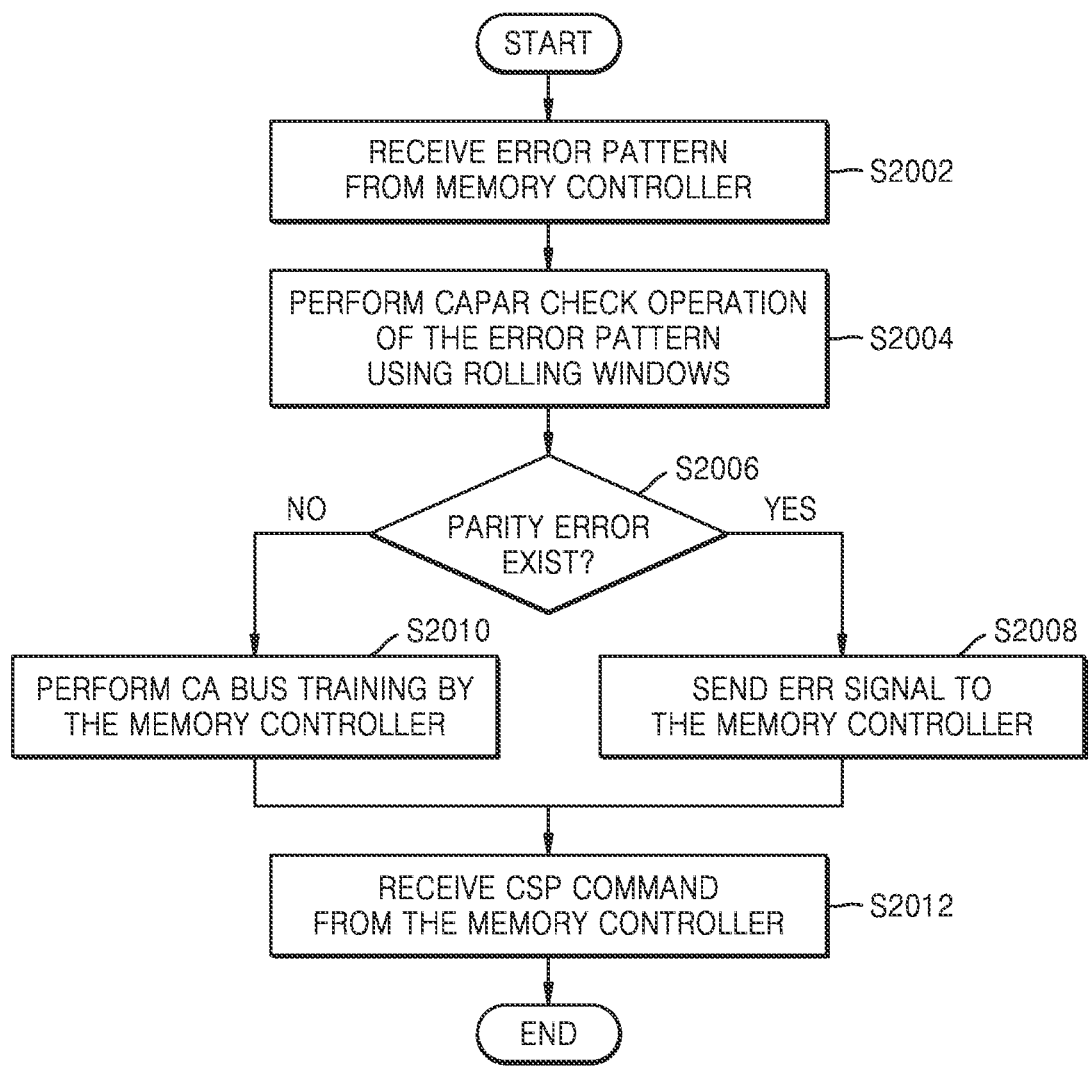
FIG. 20 is a diagram showing a method of operating a memory device for performing a CAPAR checking operation according to the rolling window-based CAPAR checking method of FIG. 19.

FIG. 20 is a diagram showing a method of operating a memory device for performing a CAPAR checking operation according to the rolling window-based CAPAR checking method of FIG. 19.

Referring to FIGS. 18, 19 and 20, in operation S2002, the memory device 120 may receive an error pattern from the memory controller 110. As shown in FIG. 18, in the error pattern, logic 1 values may be input as a CA0 input, a CA1 input, a CA2 input, and a CA4 input at the WCKn rising edge, the WCKn+1 rising edge, the WCKn+2 rising edge, and the WCKn+3 rising edge of the error boundary EB, a logic 0 value may be input as a CA3 input at the WCKn rising edge, the WCKn+1 rising edge, and the WCKn+2 rising edge, and a logic 1 value may be input at the WCKn+3 rising edge. The memory controller 110 may transmit an error pattern causing a CA parity error to the memory device 120 and expect an error signal ERR having a PAM3 signal level −1 indicating a CA parity error.

In operation S2004, the memory device 120 may perform a CAPAR checking operation on the error pattern by using rolling windows. As described with reference to FIG. 19, the in the CAPAR checking operation, it may be determined whether the total number of logical 0 bit values from among CA[4:0] input values in the windows 1906 to 1914 constituting rolling windows is calculated as an even value. According to another example embodiment, it may be checked whether the total number of logic 1 bit values from among CA[4:0] input values in the windows 1906 to 1914 constituting the rolling windows is calculated as an even value.

In operation S2006, the memory device 120 may determine whether there is a CA parity error in the error pattern as a CAPAR checking result. When the CAPAR checking result is an odd value, a parity error may be identified as existing, the method may proceed to operation S2008, and the memory device 120 may output an error signal ERR indicating a CA parity error as a level −1 PAM3 signal and transmit the error signal ERR to the memory controller 110. The memory controller 110 may receive an expected error signal ERR, determine that the error pattern is valid, and issue a CSP command to the memory device 120.

When the CAPAR checking result of operation S2006 is an even value, the memory device 120 may output an error signal ERR indicating that there is no CA parity error as a level +1 PAM3 signal and transmit the error signal ERR to the memory controller 110. Because the error signal ERR is not an expected level −1 PAM3 signal, the memory controller 110 may determine that the error pattern is invalid, re-perform CA bus training on the memory device 120 in operation S2010, and issue a CSP command to the memory device 120.

In operation S2012, the memory device 120 may receive a CSP command having a CSP synchronized with a WCK0 rising edge, receive and decode subsequent commands having CSPs respectively synchronized with a WCK4 rising edge and a WCK8 rising edge, and performs operations according to the corresponding commands.

FIGS. 21A to 21D are diagrams showing error patterns according to example embodiments.

Figure 21A:
FIGS. 21A, 21B, 21C and 21D are diagrams showing error patterns according to example embodiments.

Referring to FIG. 21A, an error pattern may be provided as a CA[4:0] input from a WCK0 rising edge, which is the start point of the error pattern. In the error pattern, logic 1 values are input as a CA1 input, a CA2 input, a CA3 input, and a CA4 input at a WCK0 rising edge, a WCK1 rising edge, a WCK2 rising edge, and a WCK3 rising edge, respectively, a logic 0 value may be input as a CA0 input at the WCK0 rising edge, the WCK1 rising edge, and the WCK2 rising edge, and a logic 1 value may be input at the WCK3 rising edge.

Figure 21B:

Referring to FIG. 21B, in the error pattern, logic 1 values are input as a CA0 input, a CA2 input, a CA3 input, and a CA4 input at a WCK0 rising edge, a WCK1 rising edge, a WCK2 rising edge, and a WCK3 rising edge, respectively, a logic 0 value may be input as a CA1 input at the WCK0 rising edge, the WCK1 rising edge, and the WCK2 rising edge, and a logic 1 value may be input at the WCK3 rising edge.

Figure 21C:

Referring to FIG. 21C, in the error pattern, logic 1 values are input as a CA0 input, a CA1 input, a CA3 input, and a CA4 input at a WCK0 rising edge, a WCK1 rising edge, a WCK2 rising edge, and a WCK3 rising edge, respectively, a logic 0 value may be input as a CA2 input at the WCK0 rising edge, the WCK1 rising edge, and the WCK2 rising edge, and a logic 1 value may be input at the WCK3 rising edge.

Figure 21D:

Referring to FIG. 21D, in the error pattern, logic 1 values are input as a CA0 input, a CA1 input, a CA2 input, and a CA3 input at a WCK0 rising edge, a WCK1 rising edge, a WCK2 rising edge, and a WCK3 rising edge, respectively, a logic 0 value may be input as a CA4 input at the WCK0 rising edge, the WCK1 rising edge, and the WCK2 rising edge, and a logic 1 value may be input at the WCK3 rising edge.

In FIGS. 21A to 21D, CA[4:0] operands of each of error patterns may correspond to an error pattern intended by the memory controller 110 to be calculated as an odd value in a CA parity checking operation, i.e., detection of a CA parity error is intended. The memory controller 110 will expect an error signal ERR having a PAM3 signal level of −1 as a CAPAR checking result for error patterns received from the memory device 120.

Figure 22A:
FIGS. 22A, 22B and 22C are diagrams showing error patterns according to example embodiments.
Figure 22B:
Figure 22C:

FIGS. 22A to 22C are diagrams showing error patterns according to example embodiments.

Referring to FIG. 22A, an error pattern may be provided as a CA[4:0] input from a WCK0 rising edge, which is the start point of the error pattern. In the error pattern, logic 1 values are input as a CA1 input, a CA2 input, a CA3 input, and a CA4 input at a WCK0 rising edge, a WCK1 rising edge, a WCK2 rising edge, and a WCK3 rising edge, respectively, a logic 0 value may be input as a CA0 input at the WCK0 rising edge, and the WCK1 rising edge, and logic 1 values may be input at the WCK2 rising edge and the WCK3 rising edge.

Referring to FIG. 22B, in the error pattern, logic 1 values are input as a CA0 input, a CA1 input, a CA3 input, and a CA4 input at a WCK0 rising edge, a WCK1 rising edge, a WCK2 rising edge, and a WCK3 rising edge, respectively, a logic 0 value may be input as a CA2 input at the WCK0 rising edge, and the WCK1 rising edge, and logic 1 values may be input at the WCK2 rising edge and the WCK3 rising edge.

Referring to FIG. 22C, in the error pattern, logic 1 values are input as a CA0 input, a CA1 input, a CA2 input, and a CA3 input at a WCK0 rising edge, a WCK1 rising edge, a WCK2 rising edge, and a WCK3 rising edge, respectively, a logic 0 value may be input as a CA4 input at the WCK0 rising edge, and the WCK1 rising edge, and logic 1 values may be input at the WCK2 rising edge and the WCK3 rising edge.

In FIGS. 22A to 22C, CA[4:0] operands of each of error patterns may correspond to an error pattern calculated as an even value in a CA parity checking operation. The memory controller 110 will expect an error signal ERR having a PAM3 signal level of +1 as a CAPAR checking result for error patterns received from the memory device 120.

Figure 23A:
FIGS. 23A, 23B and 23C are diagrams showing error patterns according to example embodiments.
Figure 23B:
Figure 23C:

FIGS. 23A to 23C are diagrams showing error patterns according to example embodiments.

Referring to FIG. 23A, an error pattern may be provided as a CA[4:0] input from a WCK0 rising edge, which is the start point of the error pattern. In the error pattern, logic 1 values are input as a CA1 input, a CA2 input, a CA3 input, and a CA4 input at a WCK0 rising edge, a WCK1 rising edge, a WCK2 rising edge, and a WCK3 rising edge, respectively, a logic 0 value may be input as a CA0 input at the WCK0 rising edge, and logic 1 values may be input at the WCK1 rising edge, the WCK2 rising edge, and the WCK3 rising edge.

Referring to FIG. 23B, an error pattern may be provided as a CA[4:0] input from a WCK0 rising edge, which is the start point of the error pattern. In the error pattern, logic 1 values are input as a CA0 input, a CA1 input, a CA3 input, and a CA4 input at a WCK0 rising edge, a WCK1 rising edge, a WCK2 rising edge, and a WCK3 rising edge, respectively, a logic 0 value may be input as a CA2 input at the WCK0 rising edge, and logic 1 values may be input at the WCK1 rising edge, the WCK2 rising edge, and the WCK3 rising edge.

Referring to FIG. 23C, an error pattern may be provided as a CA[4:0] input from a WCK0 rising edge, which is the start point of the error pattern. In the error pattern, logic 1 values are input as a CA0 input, a CA1 input, a CA2 input, and a CA3 input at a WCK0 rising edge, a WCK1 rising edge, a WCK2 rising edge, and a WCK3 rising edge, respectively, a logic 0 value may be input as a CA4 input at the WCK0 rising edge, and logic 1 values may be input at the WCK1 rising edge, the WCK2 rising edge, and the WCK3 rising edge.

In FIGS. 23A to 23C, CA[4:0] operands of each of error patterns may correspond to an error pattern intended by the memory controller 110 to be calculated as an odd value in a CA parity checking operation, i.e., detection of a CA parity error is intended. The memory controller 110 will expect an error signal ERR having a PAM3 signal level of −1 as a CAPAR checking result for error patterns received from the memory device 120.

FIG. 24 is a diagram showing an error pattern according to example embodiments.

Referring to FIG. 24, an error pattern may be randomly provided as CA[4:0] inputs during 74 WCK clock cycles. An error pattern may be input from a WCK3 rising edge, which is the start point of the error pattern, to a WCK76 rising edge. In the error pattern, logic values may be repeatedly input at the order of 0-1-1-1-0-1 as a CA0 input, a CA2 input, and a CA4 input and logic values may be repeatedly input in the order of 0-1 as a CA1 input and a CA3 input, at each of WCK rising edges. Also, the error pattern may be configured, such that the total number of logic 0 bit values of CA0, CA1, CA2, CA3, and CA4 operands input at respective WCK rising edges is two, i.e., an even value. For example, logic 0 values may be input as a CA0 input and a CA4 input and logic 1 values may be input as a CA1 input, a CA2 input, and a CA3 input at a WCK3 rising edge, logic 0 values may be input as a CA1 input and a CA3 input and logic 1 values may be input as a CA0 input, a CA2 input, and a CA4 input at a WCK4 rising edge, and logic 0 values may be input as a CA2 input and a CA4 input and logic 1 values may be input as a CA0 input, a CA1 input, and a CA3 input at a WCK5 rising edge.

In FIG. 24, CA[4:0] operands of the error pattern may correspond to an error pattern calculated as an even value in a CA parity checking operation. The memory controller 110 will expect an error signal ERR having a PAM3 signal level of +1 as a CAPAR checking result for error patterns received from the memory device 120.

Figure 25:
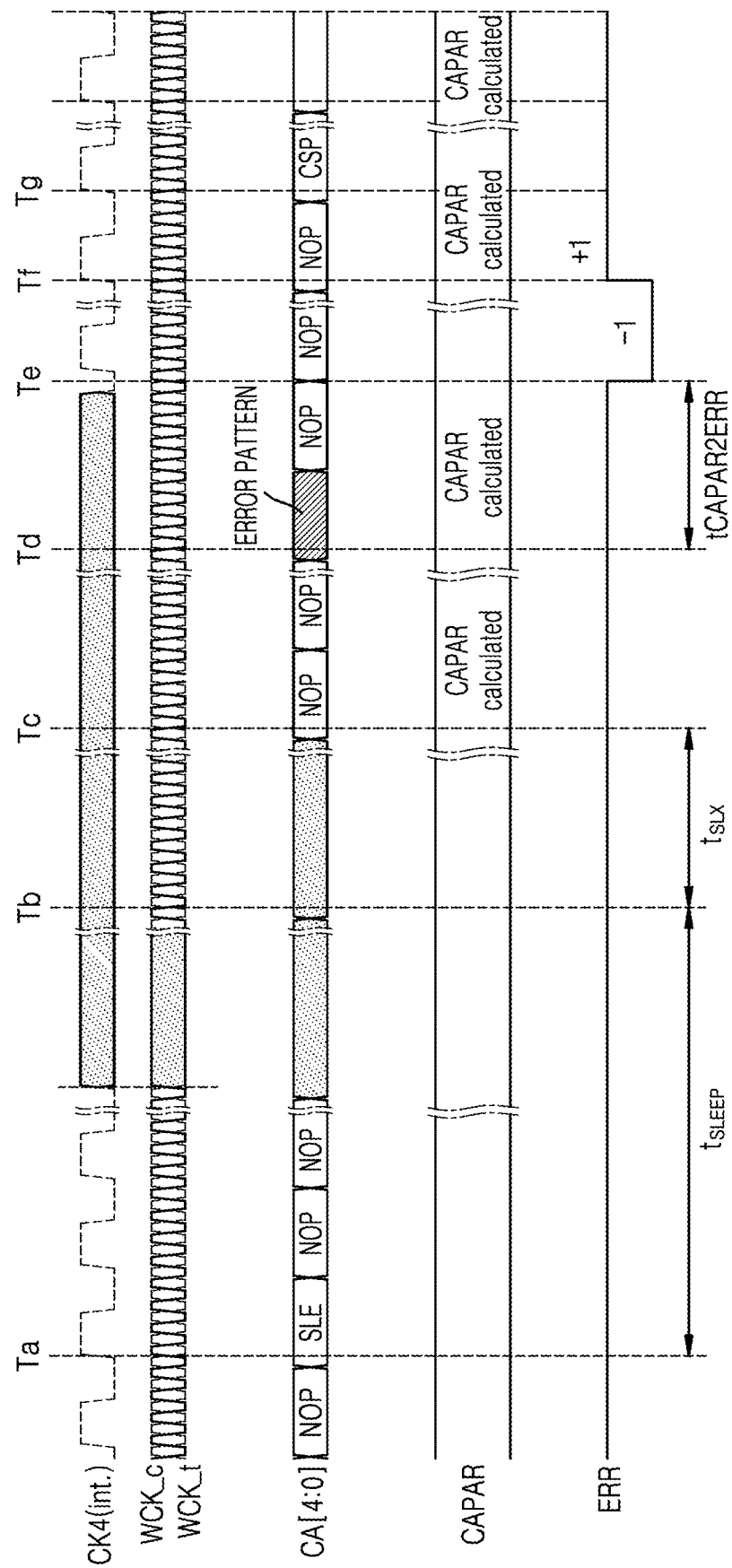
FIG. 25 is a timing diagram associated with an operation of a memory device according to example embodiments.

FIG. 25 is a timing diagram associated with an operation of a memory device according to example embodiments. In FIG. 25, an operation of notifying CAPAR checking results for error patterns described with reference to FIGS. 18 to 24 to the memory controller 110.

Referring to FIG. 25, a sleep entry command SLE is applied to a CA[4:0] signal line at a time point Ta, the memory device 120 is in a sleep state for a time $t_{SLEEP}$, and the clock signal WCK may be deactivated in the sleep state. The clock signal WCK may be activated during a time $t_{SLX}$ between a time point Tb and a time point Tc in which the memory device 120 wakes up from the sleep state.

At a time point Td, an error pattern may be applied to the CA[4:0] signal line. The memory device 120 may check whether the total number of logic 0 bit values from among CA[4:0] input values in the windows 1906 to 1914 constituting the rolling windows during a time tCARPAR2ERR between the time point Td and a time point Te is an even value.

When a CAPAR checking result is an odd value, the memory device 120 may transmit an error signal ERR indicating a CA parity result regarding the error pattern for four WCK clock cycles from the time point Te to a time point Tf and transmit the error signal ERR to the memory controller 110. The memory device 120 may transmit an error signal ERR having a PAM signal level of −1 to the memory controller 110 when a CA parity result corresponds to an odd parity and transmit an error signal ERR having a PAM signal level of +1 to the memory controller 110 when a CA parity result corresponds to an even parity. When the memory controller 110 receives an expected error signal ERR, the memory controller 110 may determine that the error pattern is valid and issue a CSP command to the memory device 120. On the contrary, when a received error signal ERR is not the expected error signal ERR, the memory controller 110 may determine that the error pattern is invalid, re-perform CA bus training on the memory device 120, and issue a CSP command to the memory device 120. At a time point Tg, the memory device 120 may receive a CSP command having the CSP synchronized with a WCK0 rising edge.

Figure 26:
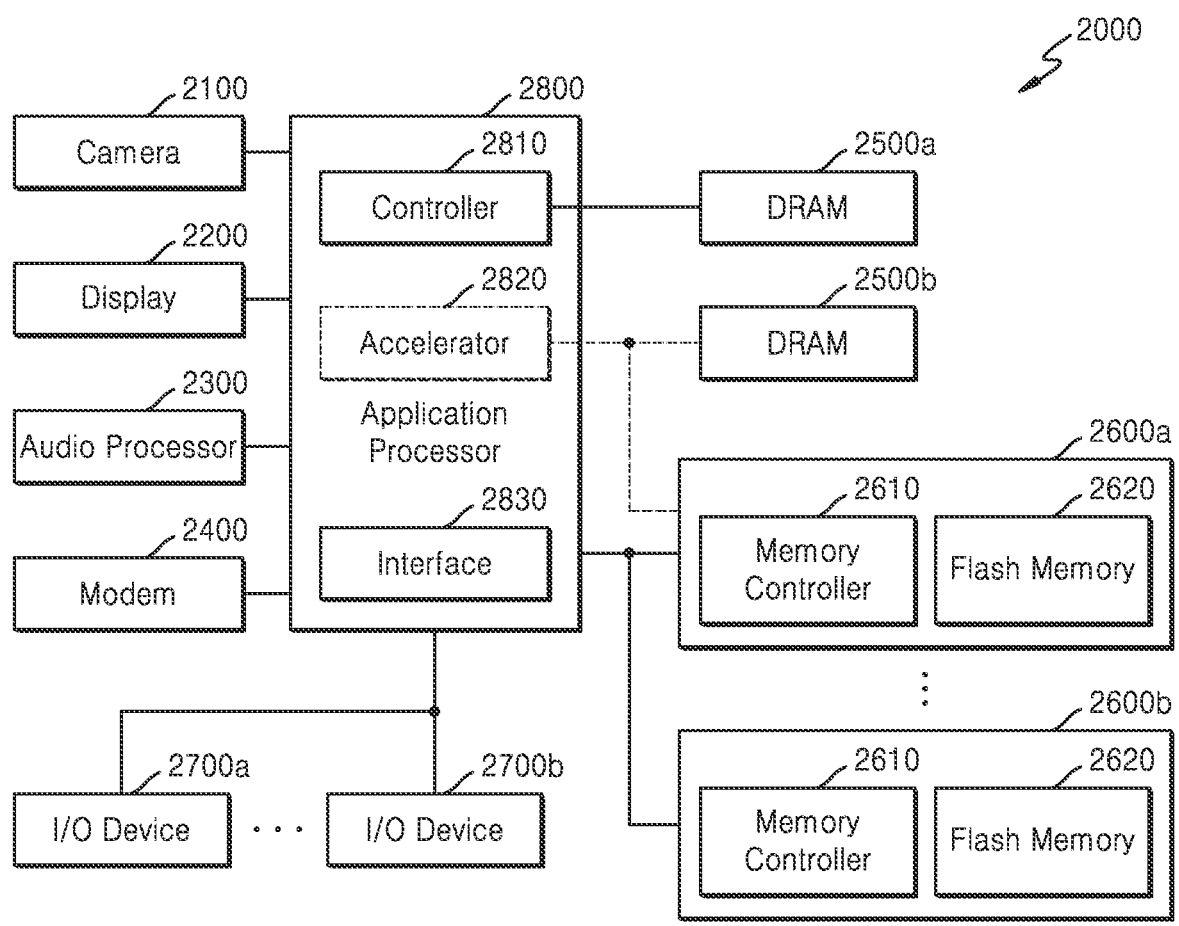
FIG. 26 is a block diagram of a system for describing an electronic device including a memory device according to example embodiments.

FIG. 26 is a block diagram of a system 2000 for describing an electronic device including a memory device according to example embodiments.

Referring to FIG. 26, the system 2000 may include a camera 2100, a display 2200, an audio processor 2300, a modem 2400, DRAMs 2500a and 2500b, flash memories 2600a and 2600b, I/O devices 2700a and 2700b, and an AP 2800. The system 2000 may be implemented as a laptop computer, a mobile phone, a smartphone, a tablet PC, a wearable device, a healthcare device, or an IoT)T device. Also, the system 2000 may be implemented as a server or a PC.

The camera 2100 may capture a still image or a video according to a user's control and may store captured image/video data or transmit the captured image/video data to the display 2200. The audio processor 2300 may process audio data included in the flash memories 2600a and 2600b or network content. The modem 2400 may transmit a modulated signal for wired/wireless data transmission/reception to a receiver and the modulated signal may be demodulated by the receiver to restore an original signal. The I/O devices 2700a and 2700b may include devices providing a digital input function and/or digital output function, e.g., a Universal Serial Bus (USB), a storage, a digital camera, a Secure Digital (SD) card, a Digital Versatile Disc (DVD), a network adapter, a touch screen, etc.

The AP 2800 may control the overall operation of the system 2000. The AP 2800 may include a control block 2810, an accelerator block or accelerator chip 2820, and an interface block 2830. The AP 2800 may control the display 2200, such that a part of content stored in the flash memories 2600a and 2600b is displayed on the display 2200. When a user input is received through the I/O devices 2700a and 2700b, the AP 2800 may perform a control operation corresponding to the user input. The AP 2800 may include an accelerator block, which is a circuit dedicated for calculation of Artificial Intelligence (AI) data, or may include an accelerator chip 2820 separately from the AP 2800. The DRAM 2500b may be additionally provided in the accelerator block or the accelerator chip 2820. The accelerator block is a functional block that specializes in performing a particular function of the AP 2800 and may include a GPU, which is a functional block that specializes in processing graphic data, a neural processing unit (NPU), which is a block that specializes in AI calculation and inference, and a data processing unit (DPU), which is a block that specializes in data transmission.

The system 2000 may include a plurality of DRAMs 2500a and 2500b. The AP 2800 may set up a DRAM interface protocol and communicate with the DRAMs 2500a and 2500b to control the DRAMs 2500a and 2500b through commands complying with the Joint Electron Device Engineering Council (JEDEC) standard and mode register (MRS) setting or to use company-specific functions like low voltage/high-speed/reliability and a cyclic redundancy check (CRC)/error correction code (ECC) function. For example, the AP 2800 may communicate with the DRAM 2500a through an interface complying with the JEDEC standards like DDR, LPDDR, and GDDR (e.g., GDDR7), and the accelerator block or the accelerator chip 2820 may set and use a new DRAM interface protocol to control the DRAM 2500b for an accelerator, which has a greater bandwidth than the DRAM 2500a.

Although FIG. 26 shows only the DRAMs 2500a and 2500b, example embodiments are not limited thereto. As long as a bandwidth, a response speed, and voltage conditions of the AP 2800 or the accelerator chip 2820 are satisfied, any memory like a PRAM, an SRAM, an MRAM, an RRAM, an FRAM, or a Hybrid RAM may be used. The DRAMs 2500a and 2500b have relatively smaller latency and bandwidth than the I/O devices 2700a and 2700b or the flash memories 2600a and 2600b. The DRAMs 2500a and 2500b are initialized when the system 2000 is powered on and the OS and application data are loaded thereto, and thus the DRAMs 2500a and 2500b may be used as temporary storages for the OS and the application data or may be used as execution spaces for various software code.

In the DRAMs 2500a and 2500b, four arithmetic operations (i.e., addition, subtraction, multiplication, and division), vector calculations, address calculations, or Fast Fourier Transform (FFT) calculations may be performed. Also, in the DRAMs 2500a and 2500b, a function for an operation used for an inference may be performed. Here, the inference may be performed in a deep learning algorithm using an artificial neural network. The deep learning algorithm may include a training operation for learning a model through various data and an inference operation for recognizing data with the trained model. According to an example embodiment, an image captured by a user through the camera 2100 is signal-processed and stored in the DRAM 2500b, and the accelerator block or accelerator chip 2820 may perform AI data calculation for recognizing data using data stored in the DRAM 2500b and a function used for inference.

The system 2000 may include a plurality of storages or flash memories 2600a and 2600b having a larger capacity than the DRAMs 2500a and 2500b. The accelerator block or accelerator chip 2820 may perform a training operation and an AI data calculation using the flash memories 2600a and 2600b. According to an example embodiment, the flash memories 2600a and 2600b may include a memory controller 2610 and a flash memory device 2620, and a training operation and an inference AI data calculation performed by the AP 2800 and/or the accelerator chip 2820 may be performed more efficiently by using an arithmetic unit included in the memory controller 2610. The flash memories 2600a and 2600b may store images captured through the camera 2100 or data transmitted through a data network. For example, the flash memories 2600a and 2600b may store Augmented Reality/Virtual Reality content, High Definition (HD) content, or Ultra High Definition (UHD) content.

In the system 2000, the DRAMs 2500*a* and 2500*b* may include the memory device described above with reference to FIGS. 1 to 25. A memory device may perform a CAPAR checking operation on a CSP command applied to CA signals by using rolling windows in which each command window is delayed by one clock cycle of a clock signal WCK, find a command window identical to operands of the CSP command from among the rolling windows, and synchronize a first WCK rising edge of the command window identical to the operands of the CSP command with the start point of the CSP command. A memory device may perform a CAPAR checking operation on an error pattern, which is intended to cause a parity error in a memory controller and applied to CA signals, by using rolling windows in which each command window is delayed by one clock cycle of a clock signal WCK.

While aspects of example embodiments have been particularly shown and described, it will be understood that various changes in form and details may be made therein without departing from the spirit and scope of the following claims.

What is claimed is:

1. A memory device comprising:
    a control logic circuit configured to receive command address (CA) signals and control an operation of the memory device;
    a clock circuit configured receive a clock signal from a memory controller and divide the clock signal to generate first to fourth phase clock signals that are respectively synchronized with first to fourth rising edges of the CA signals indicating a command start point (CSP) command, wherein the first to fourth rising edges of the CA signals constitute a command window; and
    a CA parity circuit configured to perform a command address parity (CAPAR) checking operation on the CSP command, wherein the CAPAR checking operation comprises a plurality of operations respectively corresponding to rolling windows in which the command window is delayed by one clock cycle of the clock signal.

2. The memory device of claim 1, wherein the CA parity circuit is further configured to transmit an error signal indicating that a CA parity error has been identified in the CAPAR checking operation to the memory controller outside the memory device.

3. The memory device of claim 2, wherein the CA parity circuit is further configured to transmit the error signal as one of three voltage levels in a pulse amplitude modulation-3 (PAM-3) signal.

4. The memory device of claim 2, wherein the memory controller is configured to perform CA bus training on the memory device based on the error signal.

5. The memory device of claim 4, wherein the memory device is configured to receive a next CSP command after the CA bus training is performed by the memory controller.

6. The memory device of claim 1, wherein the CA parity circuit is further configured to, based on no CA parity error being identified in the CAPAR checking operation, identify a window comprising operands which correspond to those of the CSP command from among the rolling windows as the command window and synchronize a first rising edge of the command window with a start point of the CSP command.

7. The memory device of claim 6, wherein the memory device is configured to align a command boundary with the start point of the CSP command and decode the CA signals within the command boundary.

8. The memory device of claim 1, wherein the CA parity circuit comprises:
    a CA sampler circuit configured to latch the CA signals in response to each of first to fourth final phase clock signals;
    a parity calculating circuit configured to perform the CAPAR checking operation on the CA signals latched by the CA sampler circuit included in each of the rolling windows;
    a CSP check circuit configured to identify a window comprising operands which correspond to those of the CSP command with respect to the CA signals latched by the CA sampler circuit included in each of the rolling windows as the command window;
    a CSP encode circuit configured to synchronize a first rising edge of the command window with a start point of the CSP command; and
    a CSP-synchronized selection circuit configured to receive the first to fourth phase clock signals, select a phase clock signal synchronized with the start point of the CSP command from among the first to fourth phase clock signals, and output the first to fourth final phase clock signals based on the selected phase clock signal.

9. A memory device comprising:
    a control logic circuit configured to receive command address (CA) signals and control an operation of the memory device;
    a clock circuit configured receive a clock signal and divide the clock signal to generate first to fourth phase clock signals that are respectively synchronized with first to fourth rising edges of the CA signals indicating an error pattern, wherein the first to fourth rising edges of the CA signals constitute a command window; and
    a CA parity circuit configured to perform a command address parity (CAPAR) checking operation on the error pattern, wherein the CAPAR checking operation comprises a plurality of operations respectively corresponding to rolling windows in which the command window is delayed by one clock cycle of the clock signal.

10. The memory device of claim 9, wherein the CA parity circuit is further configured to transmit an error signal indicating that a CA parity error has been identified in the CAPAR checking operation to a memory controller outside the memory device.

11. The memory device of claim 10, wherein the CA parity circuit is further configured to transmit the error signal as one of three voltage levels in a pulse amplitude modulation-3 (PAM-3) signal.

12. The memory device of claim 10, wherein the memory controller is configured to perform CA bus training on the memory device based on the error signal, and the error signal is not an error signal expected by the memory controller.

13. The memory device of claim 12, wherein the memory device is configured to receive a command start point (CSP) command after the CA bus training is performed by the memory controller.

14. The memory device of claim 10, wherein the memory device is configured to receive a command start point (CSP) command from the memory controller, and the error signal is an error signal expected by the memory controller.

15. The memory device of claim 14, wherein the memory device is configured to align a command boundary with a start point of the CSP command and decode the CA signals within the command boundary.

16. A method of operating a memory device, the method comprising:
receiving a clock signal;
dividing the clock signal to generate first to fourth phase clock signals that are respectively synchronized with first to fourth rising edges of command address (CA) signals, wherein the first to fourth rising edges of the CA signals constitute a command window;
receiving the CA signals from a memory controller outside the memory device;
performing a command address parity (CAPAR) checking operation on the CA signals, wherein the CAPAR checking operation comprises a plurality of operations respectively corresponding to rolling windows in which the command window is delayed by one clock cycle of the clock signal; and
transmitting an error signal indicating a CA parity error is identified in the CAPAR checking operation to the memory controller.

17. The method of claim 16, wherein the CA signals comprise a command start point (CSP) command.

18. The method of claim 17, further comprising:
identifying a window comprising operands which correspond to those of the CSP command from among the rolling windows as the command window; and
synchronizing a first rising edge of the command window with a start point of the CSP command.

19. The method of claim 16, wherein the CA signals comprise an error pattern which intentionally causes the CA parity error by the memory controller.

20. The method of claim 19, wherein any one of the CA signals is applied as a logic 0 operand at first to third rising edges of the command window to indicate the error pattern, and is calculated as an odd value in the CAPAR checking operation.

* * * * *